US010375729B2

(12) United States Patent
Park et al.

(10) Patent No.: US 10,375,729 B2
(45) Date of Patent: Aug. 6, 2019

(54) METHOD FOR TRANSMITTING AND RECEIVING DATA IN WIRELESS COMMUNICATION SYSTEM USING SHARED BAND, AND DEVICE THEREFOR

(71) Applicant: Samsung Electronics Co., Ltd., Suwon-si, Gyeonggi-do (KR)

(72) Inventors: Seung-Hoon Park, Seoul (KR); Jung-Min Moon, Suwon-si (KR); Byoung-Hoon Jung, Seoul (KR); Sun-Heui Ryoo, Yongin-si (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 15/154,284

(22) Filed: May 13, 2016

(65) Prior Publication Data

US 2016/0338053 A1 Nov. 17, 2016

Related U.S. Application Data

(60) Provisional application No. 62/161,326, filed on May 14, 2015.

(30) Foreign Application Priority Data

Mar. 31, 2016 (KR) ........................ 10-2016-0039801

(51) Int. Cl.
*H04W 72/04* (2009.01)
*H04W 72/08* (2009.01)
(Continued)

(52) U.S. Cl.
CPC ........ *H04W 74/0808* (2013.01); *H04W 72/10* (2013.01)

(58) Field of Classification Search
CPC ........................ H04W 72/0446; H04W 72/085
See application file for complete search history.

(56) References Cited

U.S. PATENT DOCUMENTS 7,251,250 B2 * 7/2007 Boyd .................. H04W 74/085 370/336
7,894,389 B2 * 2/2011 Hyon .................... H04L 1/0025 370/329

(Continued)

OTHER PUBLICATIONS

Huawei et al., LBT schemes design for LAA, R1-151298, 3GPP TSG RAN WG1 Meeting #80bis, Apr. 10, 2015, Belgrade, Serbia.

(Continued)

*Primary Examiner* — Rasheed Gidado
(74) *Attorney, Agent, or Firm* — Jefferson IP Law, LLP

(57) ABSTRACT

A fifth generation (5G) or pre-5G communication system for supporting higher data transmission rate after a fourth generation (4G) communication system, such as long term evolution (LTE) is provided. A method of transmitting data by a transmitting device in a wireless communication system using a shared band includes determining a first length of a next time period for determining a next data transmission in the shared band based on at least one of link information configured with at least two receiving devices, and a measurement value of the transmitting device, determining whether a channel of the shared band is occupied in the next time period, and transmitting next data according to a result of the determinations.

16 Claims, 17 Drawing Sheets

(51) Int. Cl.
*H04W 74/08* (2009.01)
*H04W 72/10* (2009.01)

(56) References Cited

U.S. PATENT DOCUMENTS

| | | | | | |
|---|---|---|---|---|---|
| 8,750,195 | B2 * | 6/2014 | Koo | H04B 7/15592 | 370/315 |
| 9,820,161 | B2 * | 11/2017 | Wang | H04W 16/14 | |
| 9,883,514 | B2 * | 1/2018 | Park | H04B 7/0408 | |
| 2004/0203383 | A1 * | 10/2004 | Kelton | H04L 1/02 | 455/41.2 |
| 2006/0039281 | A1 | 2/2006 | Benveniste | | |
| 2008/0008133 | A1 * | 1/2008 | Zhu | H04W 72/085 | 370/332 |
| 2009/0016456 | A1 * | 1/2009 | Li | H04L 5/0007 | 375/260 |
| 2011/0255570 | A1 * | 10/2011 | Fujiwara | H04B 1/7143 | 375/133 |
| 2014/0301351 | A1 * | 10/2014 | Gao | H04W 74/08 | 370/329 |
| 2014/0342745 | A1 * | 11/2014 | Bhushan | H04W 28/0289 | 455/450 |
| 2015/0049715 | A1 | 2/2015 | Yerramalli et al. | | |
| 2015/0103782 | A1 * | 4/2015 | Xu | H04L 5/001 | 370/329 |
| 2016/0234835 | A1 * | 8/2016 | Yerramalli | H04L 1/0009 | |
| 2016/0277165 | A1 * | 9/2016 | Wei | H04L 5/0048 | |

OTHER PUBLICATIONS

Ericsson, Discussion on LBT Protocols, R1-151996, 3GPP TSG RAN WG1 Meeting #80bis, Apr. 11, 2015, Belgrade, Serbia.
Samsung, Discussion on LBT for LAA UL', R1-151049, 3GPP TSG RAN WG1 Ad-hoc Meeting, Mar. 18, 2015, Paris, France.

* cited by examiner

METHOD FOR TRANSMITTING AND RECEIVING DATA IN WIRELESS COMMUNICATION SYSTEM USING SHARED BAND, AND DEVICE THEREFOR

CROSS-REFERENCE TO RELATED APPLICATION(S)

This application claims the benefit under 35 U.S.C. § 119(e) of a U.S. Provisional application filed on May 14, 2015 in the U.S. Patent and Trademark Office and assigned Ser. No. 62/161,326, and under 35 U.S.C. § 119(a) of a Korean patent application filed on Mar. 31, 2016 in the Korean Intellectual Property Office and assigned Serial number 10-2016-0039801, the entire disclosure of each of which is hereby incorporated by reference.

TECHNICAL FIELD

The present disclosure relates to a method and a device for transmitting and receiving data in a wireless communication system using a shared band.

BACKGROUND

In order to satisfy the demand for wireless data traffic that has been on an increasing trend since the commercialization of 4th generation (4G) communication systems, efforts are being made to develop an advanced 5th generation (5G) or pre-5G communication system. For this reason, the 5G communication system or the pre-5G communication system is called a beyond 4G network communication system or a post long term evolution (LTE) system.

In order to achieve a high data transmission rate, the implementation of the 5G communication system in a mmWave band (for example, 60 GHz band) is being considered. In the 5G communication system, technologies such as beamforming, massive multi-input multi-output (MIMO), full dimensional MIMO (FD-MIMO), array antenna, analog beam-forming, and large scale antenna are being discussed to mitigate propagation path loss in the mmWave band and to increase propagation transmission distance.

Further, in order to improve the system network in the 5G communication system, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation have been developed.

In addition, for the 5G communication system, advanced coding modulation (ACM) schemes including hybrid frequency shift keying (FSK) and quadrature amplitude modulation (QAM) (FQAM) and sliding window superposition coding (SWSC), and advanced access techniques including filter bank multi-carrier (FBMC), non-orthogonal multiple access (NOMA), and sparse code multiple access (SCMA) are under development.

Meanwhile, in order to increase the capacity of a network, a method of using an unlicensed frequency band is considered. In using an unlicensed band, the coexistence of a user equipment (UE) and the existing wireless local area network (LAN), such as Wi-Fi and wireless local area network (WLAN), in addition to the efficiency of a resource access should be considered.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of transmitting and receiving data in a wireless communication system that shares a resource with a wireless local area network (LAN) in a shared band.

Another aspect of the present disclosure is to provide a resource access method in a wireless communication system that shares a resource with a wireless LAN in a shared band.

Another aspect of the present disclosure is to provide a resource access method for a coexistence, in which an evolved node B (eNB) semi-dynamically controls a user equipment (UE) according to a measurement result or dynamically controls the UE according to a triggering condition.

In accordance with an aspect of the present disclosure, a method of transmitting data by a transmitting device in a wireless communication device using a shared band is provided. The method includes determining a first length of a next time period for determining next data transmission in the shared band based on at least one of link information configured with at least two receiving devices and a measurement value of the transmitting device, determining whether a channel of the shared band is occupied in the next time period, and transmitting next data according to a result of the determination.

In accordance with another aspect of the present disclosure, a method of receiving data by a receiving device in a wireless communication system using a shared band is provided. The method includes receiving, from a transmitting device, data through the shared band, and transmitting a receiving result of the data to the transmitting device, wherein the transmitting data is performed if a channel of the shared band is not occupied in a next time period having a first length determined based on at least one of information on a link configured between the transmitting device and the receiving device, and a measurement value of the transmitting device.

In accordance with another aspect of the present disclosure, a transmitting device for transmitting data in a wireless communication device using a shared band is provided. The transmitting device includes a control unit configured to determine a first length of a next time period for determining next data transmission in the shared band based on at least one of link information configured with at least two receiving devices, and a measurement value of the transmitting device, and determine whether a channel of the shared band is occupied in the next time period, and a transmitting and receiving unit configured to transmit next data according to a result of the determinations.

In accordance with another aspect of the present disclosure, a receiving device for receiving data in a wireless communication system is provided. The receiving device includes a transmitting and receiving unit that receives, from the transmitting device, data through the shared band, and a control unit configured to generate a reception result of the data, and control the transmitting and receiving unit to transmit the reception result of the data to the transmitting device, wherein the data is transmitted if a channel of the shared band is not occupied in a next time period having a first length determined based on at least one of information on a link configured between the transmitting device and the receiving device, and a measurement value of the transmitting device.

Other aspects, advantages, and salient features of the disclosure will become apparent to those skilled in the art from the following detailed description, which taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
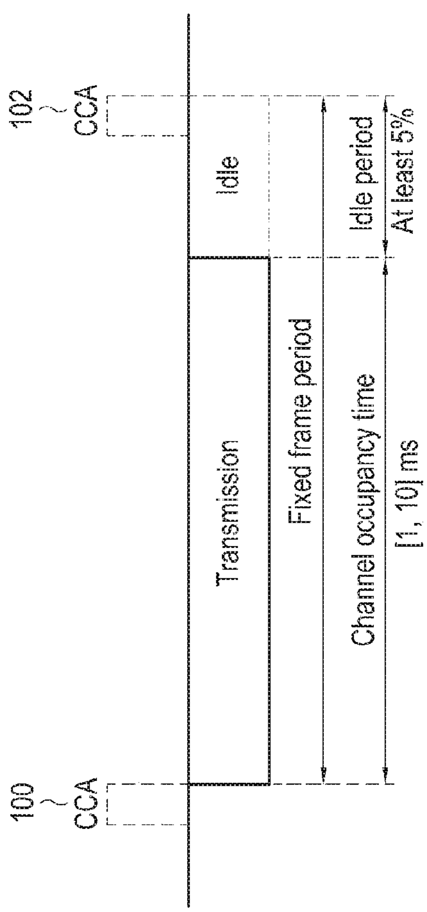
FIGS. 1A and 1B are views for describing an example of a listen before talk (LBT) regulation for a normal unlicensed band according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Hereinafter, the present disclosure proposes a method and a device for transmitting and receiving a signal in a wireless communication system using a shared band. Specifically, an embodiment of the present disclosure proposes a resource access method in a wireless communication system that shares a resource with a wireless local area network (LAN) in a shared band. In addition, the present disclosure proposes a resource access method for a coexistence, in which an evolved node B (eNB) semi-dynamically controls a user equipment (UE) according to a measurement result or dynamically controls the UE according to a triggering condition.

A communication using a shared band should follow a transmission regulation determined for a frequency band used in the communication. The transmission regulation uses various types of methods to relax signal interference between devices. The method includes a method of limiting transmission power such that reception power in a predetermined distance is not higher than a specific value, a method of hopping a position in time or frequency resources, a method of using only a predetermined resource among whole resources, a method of limiting a transmission such that the transmission is possible when reception power of the signal is smaller than a specific value after detecting a signal received from another device, or the like. A frequency band representatively utilized in the shared band is an unlicensed band referred as to license-exempt or unlicensed band. The present disclosure discloses a 5 GHz unlicensed band used in Europe, for the convenience of description. However, the present disclosure may be applied to another frequency band based on a similar sharing regulation, in addition to the 5 GHz unlicensed band. A device using the unlicensed band may be divided into a frame based equipment (FBE) or a load based equipment (LBE).

Figure 1B:
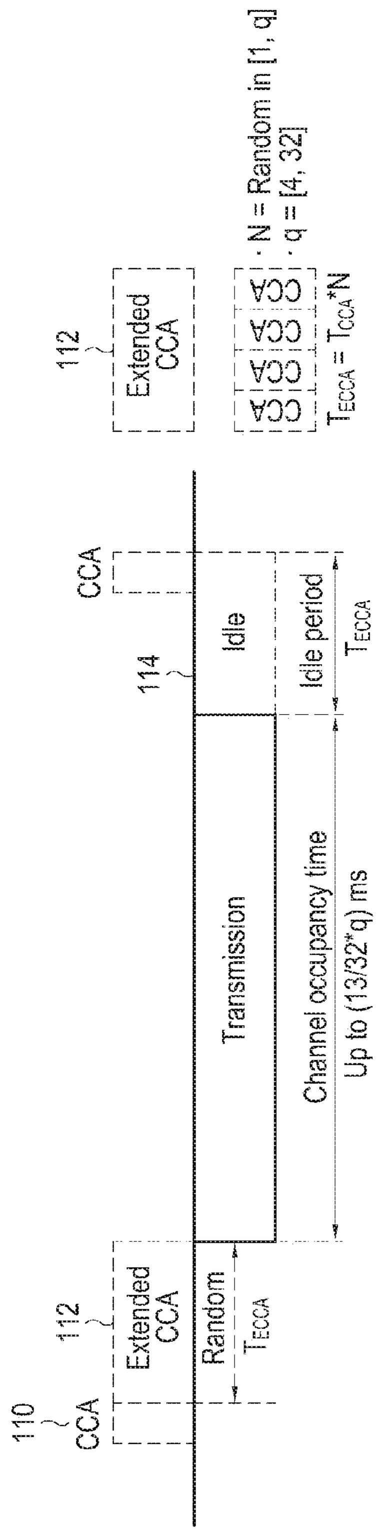

FIGS. 1A and 1B are views for describing an example of a listen before talk (LBT) regulation for a normal unlicensed band. Each device should satisfy the following regulations according to an embodiment of the present disclosure.

Referring to FIG. 1A, in the case of the FBE, before a transmitter performs a transmission, the transmitter should perform a clear channel assessment (CCA) 100 of 20 μs or more. The CCA is an operation in which the transmitter determines whether another device currently uses the unlicensed band by measuring the size of interference. Here, the measuring the size of the interference is performed by the transmitter. In addition, the transmitter does not perform a transmission when the size of the interference is equal to, or higher than, a predetermined value as a result of the performance of the CCA, and performs a transmission when the size of the interference is lower than the predetermined value. Specifically, when the FBE performs a CCA (e.g., a short CCA and a one-shot CCA) once, and the size of the interference is lower than the predetermined value as a result of the CCA, the transmitter may occupy an unlicensed band from a minimum of 1 ms to a maximum of 10 ms, and then the transmitter should not perform the transmission and stand by during a minimum of 5% of time 102 of the occupying time. Here, the duration when the transmission is not performed is referred to as an idle duration. If the size of the interference is equal to, or higher than, the predetermined value as the result of the CCA of the FBE, it is determined that another device currently uses the unlicensed band. Therefore, the FBE may perform the CCA again after a fixed frame duration has elapsed.

Referring to FIG. 1B, in the case of the LBE, equally to the case of the FBE, before the transmitter performs a transmission, the transmitter performs a CCA 110 of the minimum of 20 us or more. In addition, when it is determined that there is not a device currently using the unlicensed band because the size of the interference is lower than the predetermined value as a result of the CCA performance, the transmitter performs the transmission by occupying the unlicensed band. However, when it is determined that another device currently uses the unlicensed band because the size of the interference is equal to, or higher than, the predetermined value as the result of the CCA performance, the LBE may perform an additional CCA differently from the FBE. This is referred to as an extended CCA (ECCA) 112. The ECCA includes N CCAs. Here, N means a total number of the CCA as a value randomly selected between [1, q], and q is set as a contention window size (CWS), which is a given value. In addition, when a performance result of one CCA indicates that the unlicensed band may be occupied, the transmitter reduces one by one a CCA counter value which is set as N. Further, when the unlicensed band occupation of another device is detected before the CCA counter value becomes zero, the transmitter stores a current CCA counter value and performs a freezing operation for waiting until the unlicensed band occupation of another device is released. When the transmitter detects one more possibility of the use of the unlicensed band, the transmitter performs an operation of reducing the value of the CCA counter again according to a performance of the CCA. If, the value of the CCA counter becomes zero, when it is determined that there is not a device currently using the unlicensed band, the transmitter performs the transmission at the time point after the last CCA period. At this time, the maximum time when the LBE occupies the unlicensed band is (13/32)*q ms. After that time, the transmitter performs the ECCA again and has an idle duration 114 for the transmission during a time when the transmitter performs the ECCA again.

Each FBE and LBE has advantages and disadvantages. First, with respect to a probability of the occupation of the unlicensed band, the performance of the LBE is better than that of the FBE. Because, the FBE cannot perform the CCA during the fixed frame duration when the FBE fails the CCA once. However, the LBE may perform an operation for occupying the unlicensed band by performing the ECCA, which is the N additional CCAs, after the LBE fails the CCA. Next, with respect to scheduling, which is a physical downlink control channel (PDCCH) transmission, the FBE has advantages in which the scheduling is simpler than that of the LBE. The FBE may use the unlicensed band based on a subframe boundary, which is the PDCCH transmission time point. However, the LBE cannot equalize the subframe boundary and the start time point when the unlicensed band is used since the LBE randomly selects N, which is the CCA performance number of the ECCA. Thus, in the case of the LBE, as shown in FIG. 1B, some of a first subframe is reserved for the ECCA, and the PDCCH and a data transmission are performed from a second subframe. In addition, the FBE causes less damage to an adjacent Wi-Fi device sharing the unlicensed band compared to the LBE. This is because it may be understood that the Wi-Fi device may occupy more chances to occupy the unlicensed band, since the LBE normally has a probability of occupying the unlicensed band, which is higher than that of the FBE.

Meanwhile, in a mobile communication system, even if a UE uses an unlicensed band, in order to provide a reliable cellular communication service, it is necessary for the UE to maintain an access to a licensed band. Thus, the UE may divide and use the licensed band and the unlicensed band according to the type of the service. For example, the UE may use the licensed band when the UE transmits data for a service sensitive to a delay, such as a voice. The UE may additionally use the unlicensed band as a chance, while using the licensed band when the UE transmits data for a data service. Thus, the UE may improve the possible data transmission rate.

Meanwhile, in the existing cellular communication, such as a long term evolution (LTE), in order to determine a transmission capacity of a transmission and reception link, the following procedures are necessary. First, in a downlink, a UE measures signal quality of a reference signal transmitted from an eNB, and reports the signal quality to the eNB. Here, the reference signal of the eNB may use a common/cell-specific reference signal (CRS), a discovery reference signal (DRS), a channel state information-reference signal (CSI-RS) and the like, which are commonly transmitted from the eNB to all UEs positioned in a service coverage. Alternatively, a dedicated/demodulation reference signal (DMRS) and the like which are transmitted from the eNB to a specific UE may be used as the reference signal. In addition, the UE may be controlled by the eNB to periodically or non-periodically report channel quality to the eNB with channel quality indicator (CQI). The UE uses an uplink control channel for a periodic report and uses an uplink data channel for a non-periodic report. The eNB performs a scheduling process for determining a UE to which physical channel resource block is to be allocated based on the CQI reported from the UE. The eNB informs of allocation information according to each UE according to a result of the scheduling process. At this time, for example, the allocation information is informed with a control signal scrambled with a cell-radio network temporary identifier (C-RNTI) or a multimedia broadcast multicast service (MBMS, or M)-RNTI of the UE through the PDCCH. The UE receiving the allocation information receives the physical channel resource block allocated in a physical downlink shared channel (PDSCH) informed from the control signal. Meanwhile, in the uplink, the eNB may receive the reference signal of the UE, and may know the signal quality by measuring the reference signal. Here, the reference signal of the UE may use, for example, a sounding reference signal (SRS) allocated from the eNB to the UE periodically (e.g., in a period of 2~320 ms). Although different from a current regulation, as another embodiment, for an operation of a shared band, the use of a demodulation reference signal (DMRS), which is transmitted together in the case of the data transmission as the reference signal of the UE, may be considered. The eNB performs a scheduling process for determining a UE to which a physical channel resource block is to be allocated based on the CQI obtained by measuring the reference signal of the UE transmitted from the UE, and informs of allocation information according to each UE according to a result of the scheduling process. The allocation information is informed with a control signal scrambled with a C-RNTI or an M-RNTI of the UE through the PDCCH. The UE receiving the allocation information transmits the physical channel resource block allocated in a physical uplink shared channel (PUSCH) informed from the control signal. Before the detailed description of the present disclosure, an example of interpretable meanings of some terms used in the present disclosure is proposed. However, it is noted that the terms are not limited to the examples of the construable meanings which are proposed below.

Hereinafter, in the specification, a base station (BS) is a main object communicating with a UE. The BS may be referred to as a BS, a base transceiver station (BTS), NodeB (NB), eNodeB (eNB), access point (AP), and the like. As an example, the present disclosure is described based on a heterogeneous network including primary BS and a secondary BS. Thus, the primary BS may be referred to as macro BS, primary cell (PCell), and the like, and the secondary BS may be referred to as a small BS, a secondary cell (SCell), and the like. However, the present disclosure may be applied to another network.

Hereinafter, in the specification, a user equipment is a main object communicating with an eNB. The user equipment may be referred to as UE, a device, a mobile station (MS), a mobile equipment (ME), a terminal, and the like.

In the heterogeneous network according to an embodiment of the present disclosure, a UE may divide an eNB communicating according to a characteristic of traffic. As a specific example, the UE communicates with the PCell for main system information (SI) and a control signal transmission and reception, and traffic sensitive to mobility, such as a voice. In addition, the UE may communicate with the SCell for traffic of which an instantaneous transmission amount is important, such as data. In an embodiment of the present disclosure, it is assumed that the SCell is configured as a shared band. An example of a cellular communication system of such a type may include an LTE license-assisted access (LTE LAA) standard. For the convenience of description, in the embodiment of the present disclosure, a UE additionally using the shared band is referred to as an LAA UE, and a UE using only the existing licensed band is referred to as an LTE UE. A UE in a service area of the eNB may be in a radio resource control (RRC) idle state or may be in an RRC connected state.

The RRC idle is a state in which an eNB (or cell) is selected, a paging channel is monitored, SI is obtained, but data is not transmitted or received to or from the eNB.

The RRC connected is a state in which a control channel is monitored, and data is transmitted, or received, to or from the eNB through a data channel. The RRC connected is a state in which various measurement results of an eNB and an adjacent eNB are reported to help a scheduling of the eNB.

Specifically, the embodiment of the present disclosure proposes a resource access method for a coexistence, in which an eNB semi-dynamically controls a UE according to a measurement result or dynamically controls the UE according to a triggering condition.

According to an embodiment of the present disclosure, the resource access method for the shared band may include a semi-dynamic or dynamic control method. The semi-dynamic control method consists of adjusting variables related to a resource access based on a report by a direct measurement of the eNB or a report for a measurement of the UE. The dynamic control method consists of adjusting variables related to the resource access by setting a result obtained from a resource access and transmitting and receiving operations as a triggering condition.

In the unlicensed band, an exponential back-off algorithm, which is one of the resource access methods, is used. The exponential back-off algorithm is normally performed between one transmitting device and one receiving device. The transmitting device performs an initial CCA, for example, for 20 μs. In addition, the transmitting device compares an energy amount measured by the performance of the initial CCA with a CCA threshold, to determine whether an unlicensed band is currently occupied. If, the measured energy amount (of dBm unit) is equal to or higher than the CCA threshold, the transmitting device determines that the channel is occupied (hereinafter, it is referred to as a busy state). If the measured energy amount is lower than the CCA threshold, the transmitting device determines that the unlicensed band is currently vacant (hereinafter, it is referred to as an idle state). In addition, when a corresponding channel is the idle state, the transmitting device performs a transmission just after the initial CCA period. When the channel is the busy state, the transmitting device is changed into the ECCA procedure according to an embodiment of the present disclosure. For example, it is assumed that the ECCA includes N CCAs. Here, N and q are defined equally to the previous description. At this time, the transmitting device, according to the embodiment of the present disclosure, may adjust the value of q according to a circumstance to support a coexistence with a wireless LAN. Specifically, a range of the value of q may be determined a minimum q (i.e., min_q) to a maximum q (i.e., max_q), and the value of q may be controlled in the range. When the transmitting device firstly performs the ECCA, the q is started as min_q. In addition, the transmitting device may increase the value of q from min_q according to a specific condition, for example, by twice. As a specific example, in a wireless LAN system, when the receiving device fails a reception for a signal transmitted from the transmitting device, acknowledge (ACK) for the transmitted signal is not transmitted. Then, the transmitting device may determine that the reception of the receiving device for the transmitted signal is no acknowledge (NACK), and may set the value of q to be used in a next ECCA procedure as twice of min_q. When the receiving device succeeds the reception for the transmitted signal and thus receives the transmitted ACK, the transmitting device sets the value of q to be used in the next ECCA procedure as min_q, which is an initial value again. According to a system, there may be an algorithm having a type different from that of the exponential back-off algorithm of the wireless LAN. The above described exponential back-off algorithm includes four parts, which consist of a triggering condition for increasing the q value, a method of increasing the q value, a triggering condition for reducing the q value, and a method of reducing the q value. Each method may be variously implemented according to an embodiment. Specifically, in the case of the increase method, for example, the case in which the q value is doubled, the case in which the q value is increased one by one, the case in which the q value is increased to a maximum value, the case in which the q value is randomly determined in a specific range, and the like may be possible. In the case of the reducing method, for example, the case in which the q value is reduced by ½ time, the case in which the q value is reduced one by one, the case in which the q value is reduced to a minimum value, the case in which the q value is randomly determined in a specific range, and the like may be possible. The triggering condition for increasing the q value is the case in which normally the transmitting device cannot the ACK for a signal transmitted to the receiving device for a predetermined time, or the case in which the transmitting device directly receives the NACK. The triggering condition for reducing the q value is the case in which normally the transmitting device receives the ACK for the signal transmitted to the receiving device. For the convenience of description, in the present disclosure, a discussion for the triggering condition is performed, in consideration of an orthogonal frequency division multiple access (OFDMA) based cellular communication such as an LTE, as an example.

Triggering Condition and Procedure for an Exponential Back-Off Operation

In general, the OFDMA based cellular communication may allocate a resource to a plurality of users in one unit time. In addition, a downlink and an uplink are separated, and thus a delay may be generated for a feedback. In the case of the existing wireless LAN, the transmitting device may determine the increase or reduction of the q value according as the transmitting device receives ACK/NACK feedback of the receiving device. Such an operation is designed to prevent a transmission collision in the case of the next back-off counter selection, when a reception error between transmitting devices selecting the same back-off counter is generated in the exponential back-off algorithm. The wireless LAN basically allocates one time resource to one UE, except for an antenna based multi-user transmission method, such as a multi-user multiple input multiple output (MU-MIMO). In addition, the transmitting device performs an LBT) before a transmission. Therefore, some of interference may be excluded and thus reception performance may be secured. Accordingly, when the transmitting device selects the same back-off counter, the probability that a reception error may be generated is high. In contrast, the OFDMA based cellular communication is designed in an assumption that a transmission signal of one eNB may always overlap a transmission signal of a neighboring eNB. Nevertheless, the OFDMA based cellular communication may secure high performance by compensating an error using a physical layer re-transmission technique such as a hybrid automatic repeat request (HARQ). Thus, in the OFDMA based cellular communication, a transmission error may be generated even though neighboring eNBs do not select the same back-off counter.

An embodiment of the present disclosure proposes a combination of a triggering condition from a view of a receiving device, a triggering condition from a view of a transmitting device, and a triggering condition from a transmitting and receiving device.

1. A Triggering Condition from a View of a Receiving Device

The triggering condition for increasing the q value in the existing wireless LAN system is the case in which the transmitting device does not receive the ACK for the signal transmitted to the receiving device for a predetermined time, which is the time when the transmitting device recognizes the NACK circumstance. The note is that the ACK/NACK in the wireless LAN is for an automatic repeat-request (ARQ) process. In a cellular communication, the ARQ is operated in a radio link control (RLC) layer, and an HARQ is operated in a medium access control (MAC) layer. In order to determine the ACK/NACK for the ARQ in the RLC layer, MAC protocol data units (PDUs) transmitted several times in the MAC layer are added in the receiving device. Therefore, the ACK/NACK for the ARQ may be informed by recovering an RLC PDU. However, the transmitting device needs a long delay time to receive the NACK in the ARQ layer and to determine a triggering condition of q based on the NACK. In addition, it is difficult to obtain an accurate response for a collision in an LBT operation. Thus, in an embodiment of the present disclosure, an ARQ is replaced as the triggering condition from a view of the receiving device. Thus, the case in which the NACK feedback is received from the receiving device for each HARQ transmission, the case in which a predetermined N-th NACK feedback is received, the case in which the NACK feedback is received after a re-transmission by a maximum number, or the like may be configured.

Meanwhile, in the OFDMA based cellular system, when one ECCA is performed, a corresponding channel is identified as an idle state, and thus a plurality of UEs are allocated, determining a determination reference for a triggering condition from a view of the receiving device is ambiguous. For example, it is assumed that 10 UEs are allocated in a downlink subframe, and a reception fail is generated in only one UE. Then, a UE in which an error is generated reports the NACK feedback. Thus, a procedure for determining whether the eNB immediately increases the q value or increases the q value at only a transmission time point of the UE reporting the NACK feedback, and the like should be determined. For example, it is assumed that M UEs report the NACK feedback, among N UEs. In this case, according to an embodiment of the present disclosure, various triggering conditions for increasing the q value may be configured. For example, the various triggering conditions may include a) a triggering in the case of $M>0$, b) a triggering in the case of $M>N*C$ ($0<C<1$, c) a triggering in the case of $(N-M)*i+M*(1-i)>N*C$ ($0<C<1$), d) a triggering in the case of M==N, and the like. According to an embodiment of the present disclosure, 80% (i.e., the case of C=0.8 in b) condition) of the HARQ ACK feedback for a first DL subframe among a DL burst transmitted from the eNB is the NACK, the triggering condition for increasing the q value may be satisfied.

However, such triggering conditions have disadvantages in which the management of each traffic is impossible compared to an exponential back-off algorithm that is dispersively performed on each traffic link in a wireless LAN, since a back-off operation parameter change by ACK/NACK feedback is applied to a transmission of all eNBs.

Figure 2:
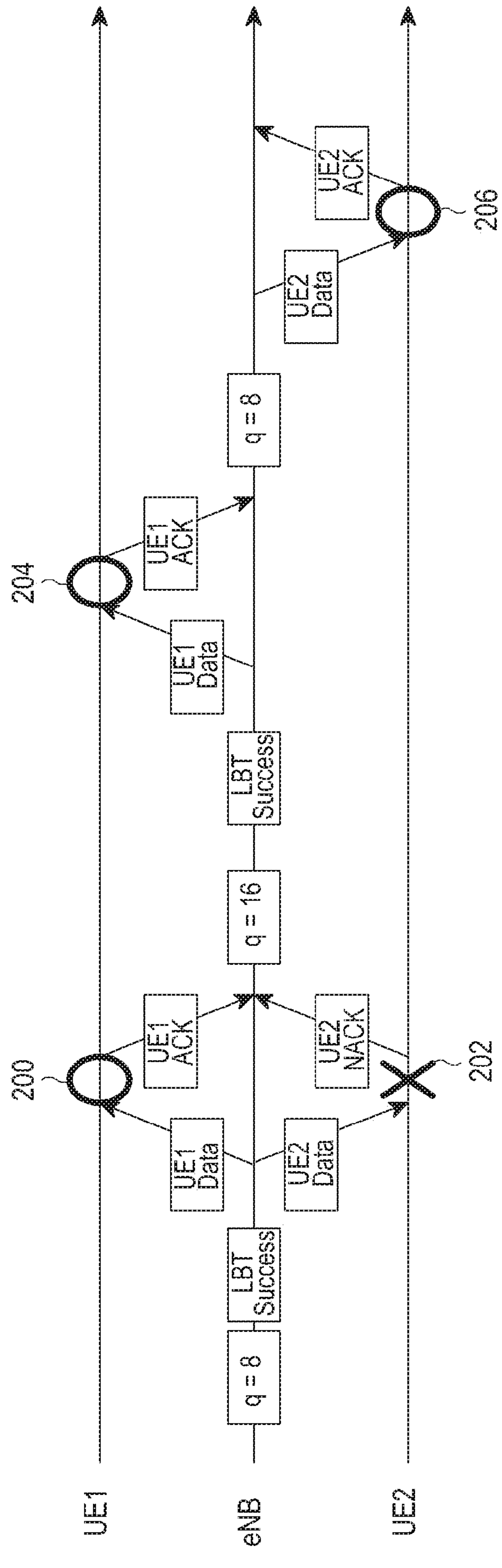
FIG. 2 is a view illustrating an example of an operation for controlling a q value by an evolved node B (eNB) according to an embodiment of the present disclosure.

FIG. 2 is a view illustrating an example of an operation for controlling a q value by an eNB according to an embodiment of the present disclosure.

Referring to FIG. 2, for example, it is assumed that the eNB performs the ECCA with the q value as the initial value 8, occupies a channel after an LBT success, and simultaneously allocates the occupied channel to a UE 1 and UE 2. In addition, it is assumed that the eNB transmits data to the UE 1 and UE 2 through the occupied channel. In this case, a reference numeral 200 shows that the UE 1 succeeds a reception of the data, and a reference numeral 202 shows that the UE 2 fails the reception of the data. Then, since the eNB receives the NACK from the UE 2, the eNB adjusts the q value as, for example, 16, which is twice that of 8, and performs the ECCA. Next, it is assumed that the eNB occupies the channel by the LBT success, allocates the currently occupied channel to only UE 1, and allocates data to the UE 1. In a reference numeral 204, the UE 1 succeeds a reception of a signal transmitted from the eNB through the occupied channel, and reports the ACK for this to the eNB. Then, the eNB recovers the q value as the initial value 8 and performs the ECCA. Next, the eNB succeeds the LBT in the ECCA, allocates the occupied channel to only UE 2, and transmits the data through the occupied channel. Then, in a reference numeral 206, the UE 2 succeeds the reception of the data and transmits the ACK to the eNB. Referring to the above operations, although the UE 2 fails the previous reception in the reference numeral 202, the UE 2 still uses the q initial value to perform the ECCA. Such a phenomenon causes a problem in which regulation requirements are not satisfied in an uplink compared to a downlink. In order to resolve such a problem, according to an embodiment of the present disclosure, the eNB may separately manage the ACK/NACK feedback for one traffic link.

Figure 3:
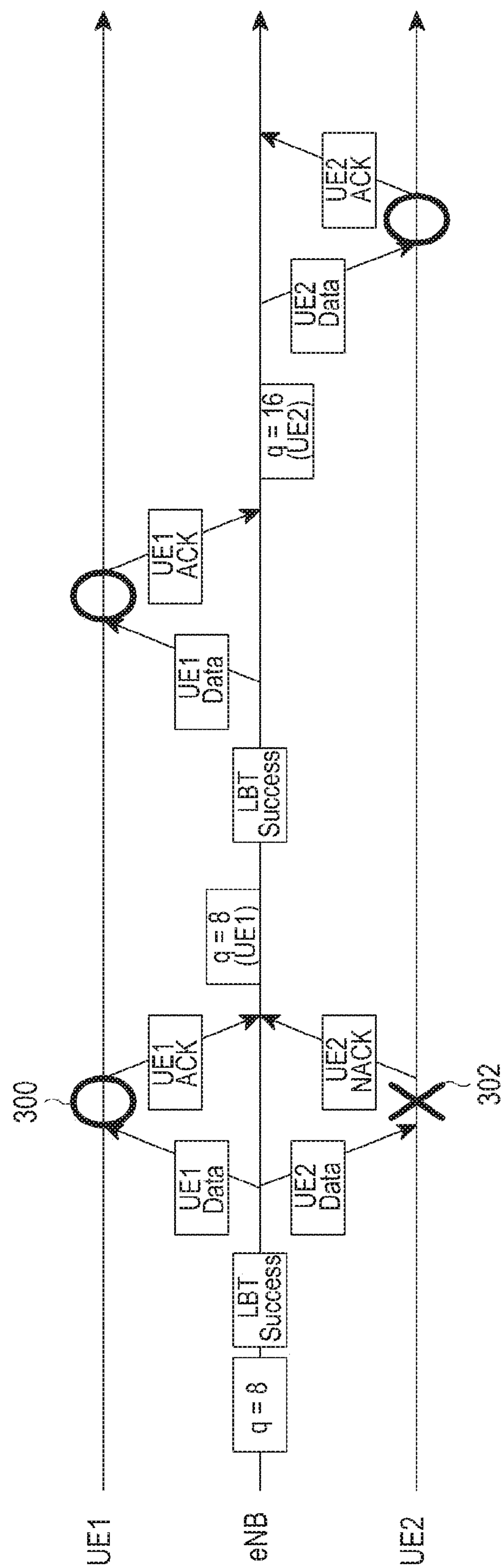
FIG. 3 is an example of an operation in which an eNB controls a q value for an extended clear channel assessment (ECCA) according to each user equipment (UE) in a downlink according to an embodiment of the present disclosure.

FIG. 3 is an example of an operation in which an eNB controls a q value for an ECCA according to each UE in a downlink according to an embodiment of the present disclosure.

Referring to FIG. 3, for the convenience of description, a data communication link between the eNB and the UE 1 is defined as a traffic link 1, and a data communication link between the eNB and the UE 2 is defined as a traffic link 2. Equally to FIG. 2, it is assumed that the eNB configures the initial q value as 8, performs the ECCA, succeeds the LBT, and allocates the occupied channel to each of the UE 1 and UE 2. In addition, the eNB transmits data to the UE 1 and UE 2 through the occupied channel. In this case, it is assumed that the UE 1 transmits the ACK feedback for the data to the eNB through an n-th subframe in a reference numeral 300, and the UE 2 transmits the NACK feedback for the data in a reference numeral 302. Then, the eNB may reduce the q value for the traffic link 1 receiving the ACK feedback. Here, since the minimum value of the q value is 8, the eNB maintains the initial q value. In addition, the eNB increases the q value for the traffic link 2 receiving the NACK feedback. FIG. 3 illustrates a case in which the q value is increased to 16, as an example. Next, when the eNB allocates it to the UE 1 the next (n+j)-th subframe, the eNB performs the ECCA operation using the q value maintained as the initial value. Meanwhile, when the eNB allocates it to the UE 2 in the next (n+k)-th subframe, the eNB performs the ECCA operation using the increased q value 16. Equally to the embodiment of FIG. 3, an operation for controlling the q value according to each traffic link may be applied to an uplink in addition to a downlink. The traffic link may be referred by dividing a successive transmission process, to which a procedure for controlling the q value is limitedly applied by the ACK/NACK. For example, when the UE operates two traffic links of which priorities are different, increase/reduction conditions of the q value, a burst length, and the like may be configured differently according to each traffic link.

Figure 4:
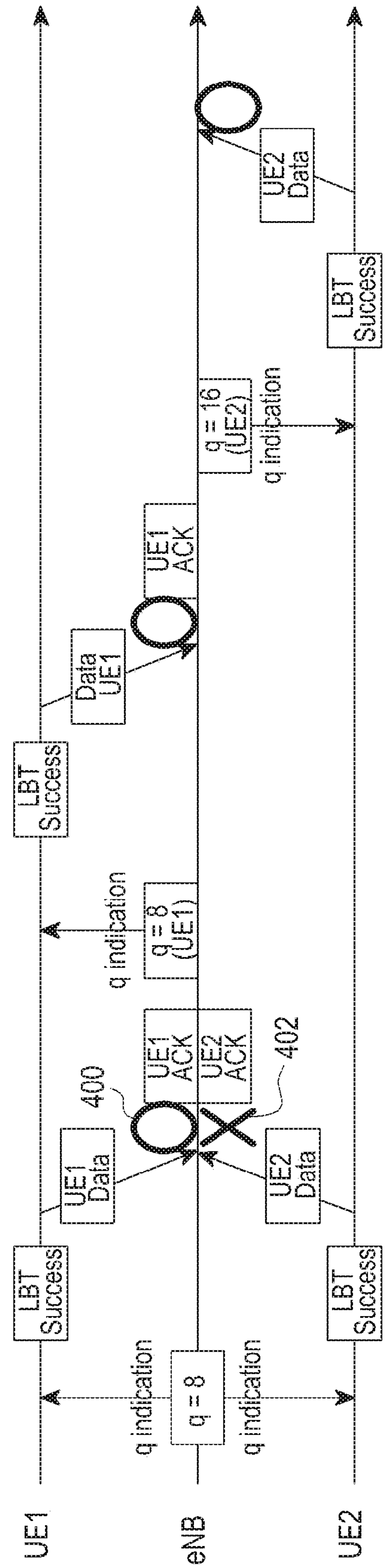
FIG. 4 is an example of an operation in which an eNB controls a q value for an ECCA according to each UE in an uplink according to an embodiment of the present disclosure.

FIG. 4 is an example of an operation in which an eNB controls a q value for an ECCA according to each UE in an uplink, according to an embodiment of the present disclosure.

Referring to FIG. 4, it is assumed that the eNB configures the initial q value as 8 for a traffic link 1 and a traffic link 2 respectively configured with the UE 1 and the UE 2, and the eNB transfers the initial q value to each UE. Then, each of the UE 1 and UE 2 performs the ECCA, succeeds the LBT, and transmits data to the eNB. In a reference numeral 400, when the eNB succeeds the reception of the data transmitted from the UE 1, the eNB may reduce the q value of UE 1. At this time, for example, since the q value of the UE 1 is 8 which is the current minimum value, the eNB maintains the current q value, and the eNB informs of this to the UE 1. In a reference numeral 402, when the eNB fails the reception of the data transmitted from the UE 2, the eNB increases the q value of UE 2 to 16, and informs of the q value to the UE 2. Next, the UE 2 performs the ECCA corresponding to the increased q value.

According to an embodiment of the present disclosure, when a plurality of UEs are allocated in a specific time point (e.g., in a subframe or UL burst period), the eNB may determine the UEs to be allocated by performing the scheduling operation, and may determine a representative q value among the plurality of UEs based on the q values stored according to each traffic link of the UE. The scheduling operation may previously be performed for one or more subframes before the LBT operation, and the representative q value of the UEs to be allocated may be determined based on the q values stored according to each traffic link corresponding to the UE to be allocated during one or more subframes. According to an embodiment of the present disclosure, the representative q value for one subframe or one UL burst (e.g., successive UL subframe group) may be selected from one among a maximum value, an average value, a weighted value, and a minimum value of the q value according to each traffic link of the plurality of UEs. Alternatively, according to an embodiment, the representative q value may use a q value of a traffic link of which a priority is lowest among the traffic links of the plurality of UEs. When one UE configures a plurality of traffic links, the representative q value of the UE may be selected from one among a maximum value, an average value, a weighted value, and a minimum value of the q value according to each of the plurality of traffic links which is being operated for the UE. According to another further embodiment, the representative q value of one UE may use a q value of the traffic link of which a priority is lowest.

An embodiment of the present disclosure proposes two options, which may be applied when the representative q value for the plurality of traffic links, is configured.

Option 1: it is the case in which the eNB controls the q value according to each UE. According to an embodiment of the present disclosure, the eNB may configure a q value of a next transmission of each UE according to HARQ ACK/NACK feedback result received from the UE in response to transmitted data, and may transmit the configured q value to a corresponding UE in a control signal form according to each UE. Here, the control signal according to each UE may be a grant, an L1 signal such as a downlink control indicator (DCI) in a PDCCH, a MAC control element (CE), an RRC message, or the like.

Option 2: it is the case in which the eNB uses and controls one q value for all UL UEs. The eNB configures a representative q value of all UEs according to HARQ ACK/NACK feedback result of all UEs which are scheduled in all or specific subframe within one UL burst, and informs of the q value of the configured next transmission to the UEs with a control signal. The HARQ ACK/NACK result may be referred to the case in which X % or more NACK feedback configured by the eNB is generated, among the objected HARQ ACK/NACK information, according to an embodiment. Here, the control signal is the same information to the plurality of UEs, and thus the control information may be a common DCI in the PDCCH or may be formed in an SIB message type. Meanwhile, the option 2 groups the UEs located in different congestion environments to control the UEs equally, and thus a time loss may be generated in a random UE.

According to an embodiment of the present disclosure, a more detailed description of the case in which a plurality of traffics is multiplexed is described below. For example, when the eNB configures a q value of a traffic having the lowest priority among different priorities as the representative q value, in a specific period (e.g., a subframe, a burst, a long period configured by an RRC, or the like), the eNB cannot rely on whether the UE actually transmits data corresponding to a traffic of a priority configured to the UE. For example, when the eNB gives a traffic of a high priority to a specific burst transmission, and thus the eNB configures a small q value, which is a back-off window size, however, the UE transmits a traffic of a low priority not the priority configured by the eNB, the eNB cannot divide a priority of a corresponding traffic. Thus, in an embodiment of the present disclosure, it is necessary to determine a priority of traffic and an LBT access based on information informed to the eNB. Specifically, in an embodiment of the present disclosure, two options are proposed for determining the LBT priority of the UE.

Option 1: the eNB is an example. The LBT priority of the UE may be determined based on an evolved packet system (EPS) bearer with a corresponding UE or QoS class identifier (QCI) mapping information of a service data flow (SDF).

Option 2: the priority may be determined based on the EPS bearer or the QCI mapping information of the SDF in an upper layer of the UE, and the determined priority of the UE may be reported to the eNB through the PUCCH or PUSCH.

The Control of q Value in a Method Besides ACK/NACK

In determining the triggering condition for increasing/reducing the q value based on the ACK/NCK feedback of the receiving side in a cellular communication, a time delay until the ACK/NACK feedback is received may be generated. For example, the NACK feedback is generated for a signal reception of the UE, after the eNB that is the transmitting device fails an actual reception, the eNB knows that the feedback is received after a predetermined time, which may be, for example, a minimum 4 ms. If, after a previous ECCA success, when the eNB fails the transmission in the last subframe of a successive subframe, the eNB cannot perform the transmission for 4 ms to comply with the regulation requirements.

According to another embodiment of the present disclosure, as another measuring value besides the ACK/NACK, the q value may be controlled based on a channel state indication (CSI) feedback received by the transmitting device from the receiving device during a transmission period after the CCA success. Since the CSI feedback of receiving device takes minimum 2 ms, there is an advantage in which the ACK/NACK feedback is faster than the minimum 4 ms. According to a specific embodiment, the case in which poorer CSI value is received during the transmission period may be configured as the triggering condition, based on the CSI value for one UE which is lastly measured by the eNB. Alternatively, according to an embodiment, the case in which the CSI feedback for an (n+1)-th CSI-RS is poorer may be configured as the triggering condition, based on a predetermined time period during the transmission period, for example, the CSI feedback measured for n-th and (n+1)-th CSI-RS. In addition, according to an embodiment, the case in which an initial CSI-RS carries on an initial signal transmitted to occupy a channel after the CCA success to transmit the initial CSI-RS, and the CSI feedback for the CSI-RS in the transmission period is poorer than the initial CSI-RS may be configured as the triggering condition. Alternatively, according to another embodiment, information on whether the channel is occupied or not in a specific time point may be configured as the triggering condition to control the q value. For example, the eNB may allocate a time slot capable of measuring information on whether the channel is occupied during the transmission period when the channel is occupied. According to an embodiment of the present disclosure, the eNB transmits information indicating the measuring time slot to all UEs through a common control signal or an individual UE through a dedicated control signal. Next, the eNB may determine whether the channel is occupied through a sum of reception power intensity received through a corresponding measuring time slot. Alternatively, the eNB may determine whether the channel is occupied through a sum of reception power intensity in which a signal element of the same operator is removed among signals received through the measuring time slot. Here, a neighboring eNB of which synchronization is the same as that of the eNB in the same operator does not transmit any signal to the measuring time of the eNB. In contrast, the eNB may carry eNB information (e.g., public land mobile network (PLMN) ID) or summary information corresponding to eNB information on a specific signal to transmit the eNB information or summary information in the measuring time slot. In an embodiment of the present disclosure, an operation of the UE for measuring a channel may be determined based on one or small number of samples in a physical layer L1, or may be determined based on a value filtered based on the sampling result of L1 in an L3 layer. But, in filtering a plurality of sample values, samples corresponding to different measurement conditions should be divided in order to be filtered. For example, the condition measured in a period when the eNB does not occupy the resource, and the condition measured in a measuring time period of a short length provided in the middle of the occupation period, when the eNB occupies the resource, should be divided.

Figure 5:
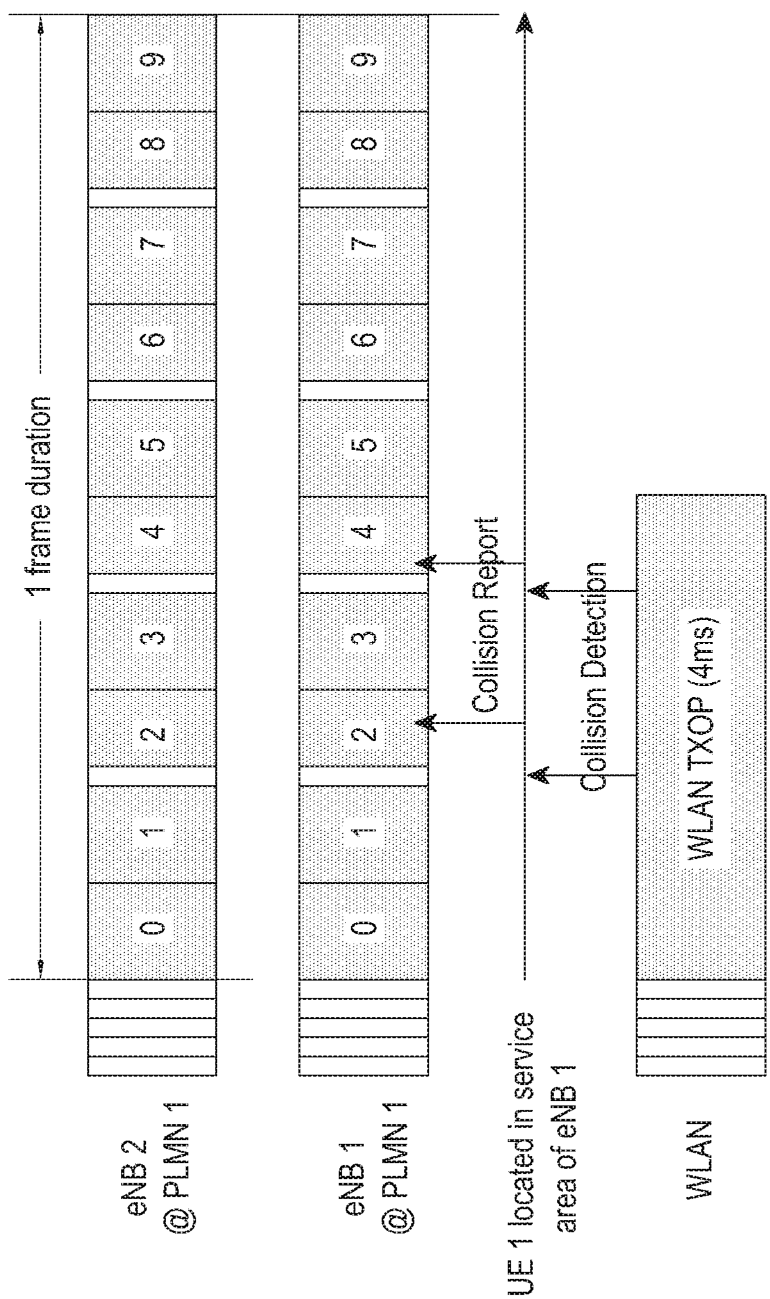
FIG. 5 is a view illustrating an example of a collision detecting operation by a CCA measurement of a UE in a measuring time slot according to an embodiment of the present disclosure.

FIG. 5 is a view illustrating an example of a collision detecting operation by a CCA measurement of a UE in a measuring time slot according to an embodiment of the present disclosure.

Referring to FIG. 5, it is assumed that each eNB 1 and eNB 2 is an eNB of the same operator (i.e., PLMN1), and a UE 1 is located in a service area of the eNB 1. In addition, as an example, it is assumed that a measuring time slot informed to the UE 1 through control information is two slots and four slots in one frame duration. In this case, when the UE determines that the channel is occupied by detecting a collision with a WLAN in the measuring time slots 2 and 4, the UE reports, to the eNB, that the channel is occupied in the time measuring time slots 2 and 4. Then, the eNB may increase the q value by configuring the report as the triggering condition. In the embodiment of FIG. 5, as an example, only a DL burst is described, but the same method may be applied to the case of an UL burst. But, in the case of the UL burst, a method in which the eNB identifies the channel occupation by performing an energy sensing and the like in a corresponding time measuring time slot may be used, instead the UE reports, to the UE, whether the channel is occupied in the time measuring time slot.

According to an embodiment of the present disclosure, the UE may compare the CCA measurement results of different time points to determine whether the channel is occupied.

Figure 6:
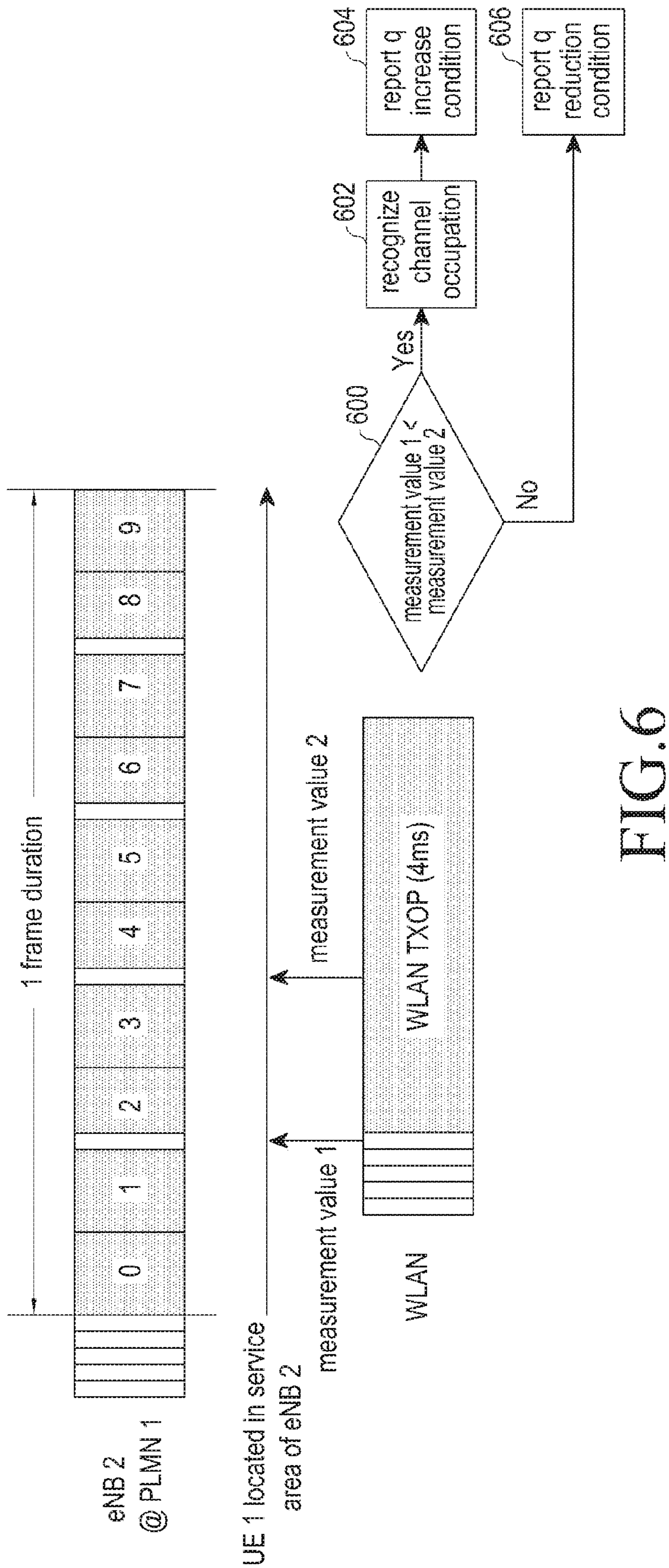
FIG. 6 is an example of an operation of the case in which a channel occupation is determined by comparing CCA measurement results of different time points according to an embodiment of the present disclosure.

FIG. 6 is an example of an operation of the case in which a channel occupation is determined by comparing CCA measurement results of different time points according to an embodiment of the present disclosure.

Referring to FIG. 6, for example, in operation 600, the UE 1 located in a service area of the eNB 2 compares a CCA measurement result (i.e., a measurement value 1) before an entrance of the transmission period with a result (i.e., a measurement value 2) measured in a measuring time slot obtained from the eNB. As a result of the comparison, when the reception power/energy value corresponding to the measurement value 2 measured in the measuring time slot is larger than reception power/energy value corresponding to the measurement value 1, it may be informed that a signal of a wireless LAN or another operator is generated after the entrance of the transmission period. Thus, in operation 602, the UE may recognize the channel occupation, and in operation 604, the UE may reports an increase condition of the q value to the eNB 1. As a result of the comparison, when the reception power/energy value corresponding to the measurement value 2 is equal to or smaller than the reception power/energy value corresponding to the measurement value 1, in operation 606, the UE may report a reduction condition of the q value to the eNB 1.

Alternatively, according to an embodiment, when larger reception power/energy value is obtained in a next measuring time slot by comparing CCA measuring results in one measuring time slot and a next measuring time slot, the UE may know that a signal of a wireless LAN or another operator is generated between two measuring time slots. The UE may configure a generation of such a difference as the triggering condition and may report the generation of such a difference to the eNB. According to another embodiment in which information on whether the channel is occupied in a specific time point is configured as the triggering condition, it may be determined based on reception power/energy value during a predetermined time just after the transmission period is finished. When the transmitting device performs and finishes the transmission in the time that is the same as that of another operator device, an end time point of a predetermined transmission period may be determined between the same operator devices. That is, a defer period when a corresponding device does not perform any operation during a predetermined time after the transmission period is ended may be configured. Usually, in order to protect a wireless LAN, the length of the defer period may be configured by the eNB or may be determined in advance. Even in a wireless LAN regulation, equally to the above description, in order to protect an ACK reception of another user, a period referred to as a DCF interframe space (DIFS) is defined. For example, in a wireless LAN regulation using 5 GHz, the DIFS is defined as 34 μsec. For a specific example, it is assumed that the eNB, according to an embodiment of the present disclosure, configures the defer period as 40 μsec, and the receiving device performs an energy detection (ED) during the defer period.

Figure 7:
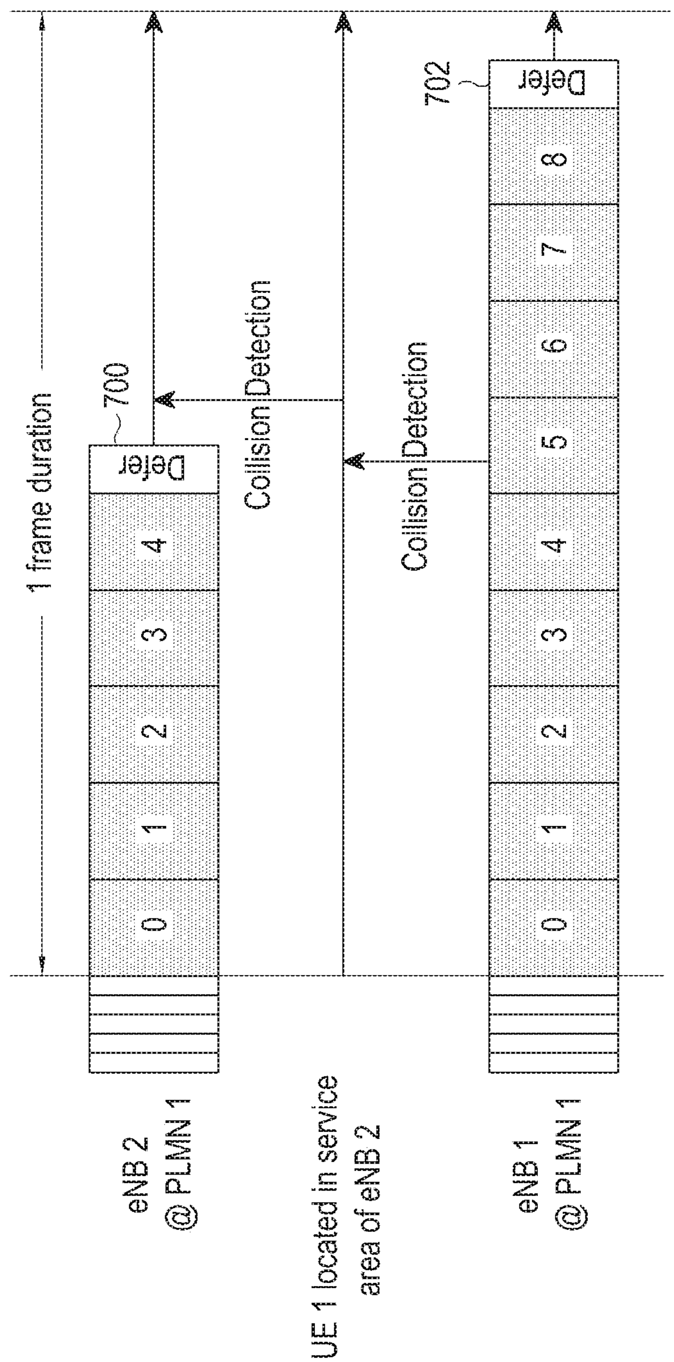
FIG. 7 is a view illustrating an example of an operation for detecting a channel occupation by a UE in a defer period according to an embodiment of the present disclosure.

FIG. 7 is a view illustrating an example of an operation for detecting a channel occupation by a UE in a defer period according to an embodiment of the present disclosure.

Referring to FIG. 7, it is assumed that the UE 1 is located in a service area of the eNB 2, and the UE detects a generation of a channel occupation in a time slot 5 during one frame of the eNB 1. In this case, the UE 1 performs the ED in a defer period 700 of the eNB 2. In addition, (in the case of the downlink), the UE 1 calculates a representative value equal to an average value or a maximum value of energy measured during the defer period 700, and compares the representative value with a specific threshold value. When the representative value is higher than the specific threshold value, the UE 1 reports the generation of the channel occupation to the eNB 2. The eNB 2 receiving the generation of the channel occupation increases the q value for the next CCA. In the same manner, in the case of the uplink, the eNB calculates a representative value equal to an average value or a maximum value of energy measured in a defer period 702 of the eNB, and compares the representative value with a specific threshold value. In addition, as a result of the comparison, when the representative value is higher than the specific threshold value, the eNB directly increases the q value for the next CCA.

In another embodiment of the present disclosure, in order to determine N that is a total number of the CCA forming the ECCA operation, N may not be selected as a random value between [1, q], and N may be selected randomly between [r, q]. Here, r is a value obtained by increasing a minimum value of a CCA window in order to consider a wireless LAN user. In addition, equally to q, a triggering condition for adjusting r may also be considered additionally.

2. A Triggering Condition from a View of a Transmitting Device

In order to overcome a problem for a triggering condition determination from a view of the receiving device, in which the q value is increased or reduced, based on the ACK/NACK feedback of the receiving device for data transmitted from the transmitting device, in an embodiment of the present disclosure, a triggering condition of the q value based on a result measured from a view of the transmitting device may be considered. According to an embodiment of the present disclosure, the result measured from the view of the transmitting device may mainly use a measurement result related to a CCA operation. For example, success or failure of each CCA, the successive success or failure of a plurality of CCAs, success or failure frequency number of the CCA, the number or frequency of a change into a freezing state in the middle of the CCA, information on whether the channel is occupied in specific time point, and the like may be used.

According to an embodiment of the present disclosure, when the triggering condition of the q value is determined based on the result measured from the view of the transmitting device, a vagueness in which the ACK/NACK feedback from a plurality of receiving devices is connected to the transmitting device may be removed. Thus, a dynamic back-off counter control is possible. Since the same operator eNBs may be installed spaced apart from each other between the same operator eNBs, whenever the NACK feedback is received, like a wireless LAN, it is not necessary to increase the q value. This is one reason to access from the view of the transmitting device. Basically, since the cellular communication is a system suggesting a simultaneous transmission, the increase of the q value is rather against the philosophy of such a cellular communication. Therefore, it is preferable to apply the increase of the q value when a wireless LAN signal is detected as a value that is equal to, or higher than, a predetermined threshold value. In this aspect, a function of detecting a signal of the same operator eNB may mainly be used in an embodiment of the present disclosure. For example, when a corresponding eNB detects the signal of the same operator eNB in the middle of the performance of the CCA, the corresponding eNB measures power/energy of the signal element and subtracts the power/energy of the signal element from a sum of the power/energy of the whole signal element. When power that is equal to, or higher than, the specific CCA threshold value is received even though the signal element of the same operator eNB is removed, it may be determined that an adjacent wireless LAN device or an eNB of another operator transmit a signal. Alternatively, a reference signal, such as a preamble of a wireless LAN, may directly be detected and sensed. In an embodiment of the present disclosure, such a circumstance is configured as the triggering condition, the q value is increased for a coexistence, and the q value may be applied to the next CCA performance. In addition, according to an embodiment, for a result of a performance of an ED in which the same operator eNB signal is removed, in the CCA, or for a result of a detection of a wireless LAN signal, at least one of success/failure of each CCA, successive success/failure of a plurality CCAs, success/failure frequency of the CCA, and the number of frequency of a change into the freezing state in the middle of the CCA may be determined to determine at least one as the triggering condition.

In addition, instead of removing the signal element of the same operator eNB, when the signal of the same operator eNB is detected or the wireless LAN signal is not detected, an aggressive transmission may be performed by increasing the CCA threshold value. In this case, due to the increase of the CCA threshold value, the communication of the wireless LAN device may be damaged. Therefore, in an embodiment of the present disclosure, it may be measured whether there is the case in which the value of the reception is higher than a basic CCA threshold value configured as a low value in order to consider the wireless LAN, and the q value to be used next time may be increased. For the convenience of description, the case in which the CCA threshold value is increased for the aggressive transmission is referred to as a high-CCA (or high level CCA), and the case in which the basic CCA threshold value is used is referred to as a low-CCA (or low level CCA). Specifically, in an embodiment of the present disclosure, the eNB performs the transmission according to the determination of whether the channel is occupied through the high level CCA, and the q value is controlled according to a success or failure of the low level CCA. According to an embodiment, at least one of success/failure of each low-CCA, successive success/failure of a plurality of low-CCA, success/failure frequency of the low-CCA, and the number or frequency of a change into the freezing state in the middle of the low-CCA may be determined to determine at least one as the triggering condition.

According to an embodiment of the present disclosure, the eNB may configure information on whether the channel is occupied in a specific time point as the triggering condition to control the q value. For example, the eNB may allocate a measuring time slot capable of measuring whether the channel is occupied or not during a transmission period when the eNB occupies the channel. The eNB may share information on the position of the measuring time slot with neighboring eNBs in advance, and may determine whether the channel is occupied according to a result measured in the position of the measuring time slot.

Figure 8:
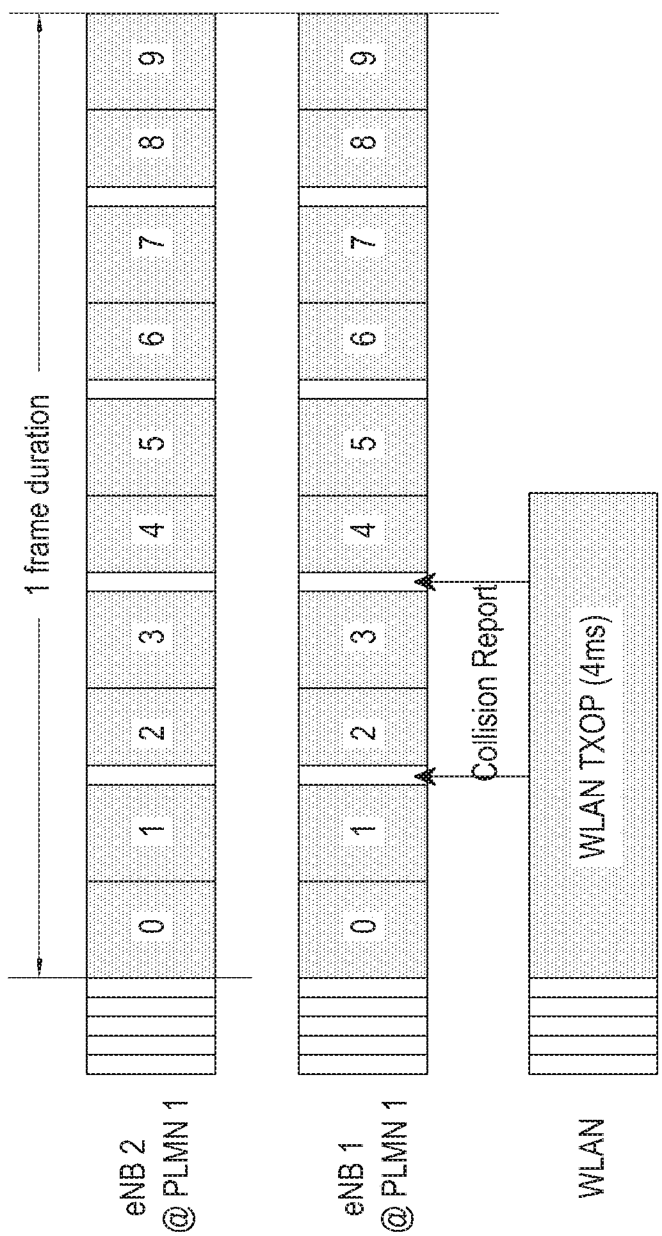
FIG. 8 is a view illustrating an example of an operation in which an eNB detects whether a channel is occupied in a measuring time slot according to an embodiment of the present disclosure.

FIG. 8 is a view illustrating an example of an operation in which an eNB detects whether a channel is occupied in a measuring time slot according to an embodiment of the present disclosure.

Referring to FIG. 8, as an example, it is assumed that the eNB 1 allocates a time slot 2 and a time slot 4 as a measuring time slot in one frame duration, and the eNB 1 shares position information of the measuring time slot with a neighboring eNB 2. Then, the eNB 1 may determine whether the channel is occupied through a sum of reception power intensity received in the measuring time slots 2 and 4. Alternatively, when the eNB 1 receives a signal element of the same operator in the measuring time slots 2 and 4, the eNB 1 may determine whether the channel is occupied through a sum of reception power intensity in which the signal element of the same operator is eliminated from the received signals in the measuring time slots 2 and 4. As an example of neighboring eNBs of which synchronization is the same in the same operator, the eNB 2 does not transmit a signal in the measuring time slots 2 and 4, which is recognized through the eNB 1. In addition, a neighboring eNB may detect whether the channel is occupied through another measuring time slot besides the measuring time slots 2 and 4 of the eNB 1.

Figure 9:
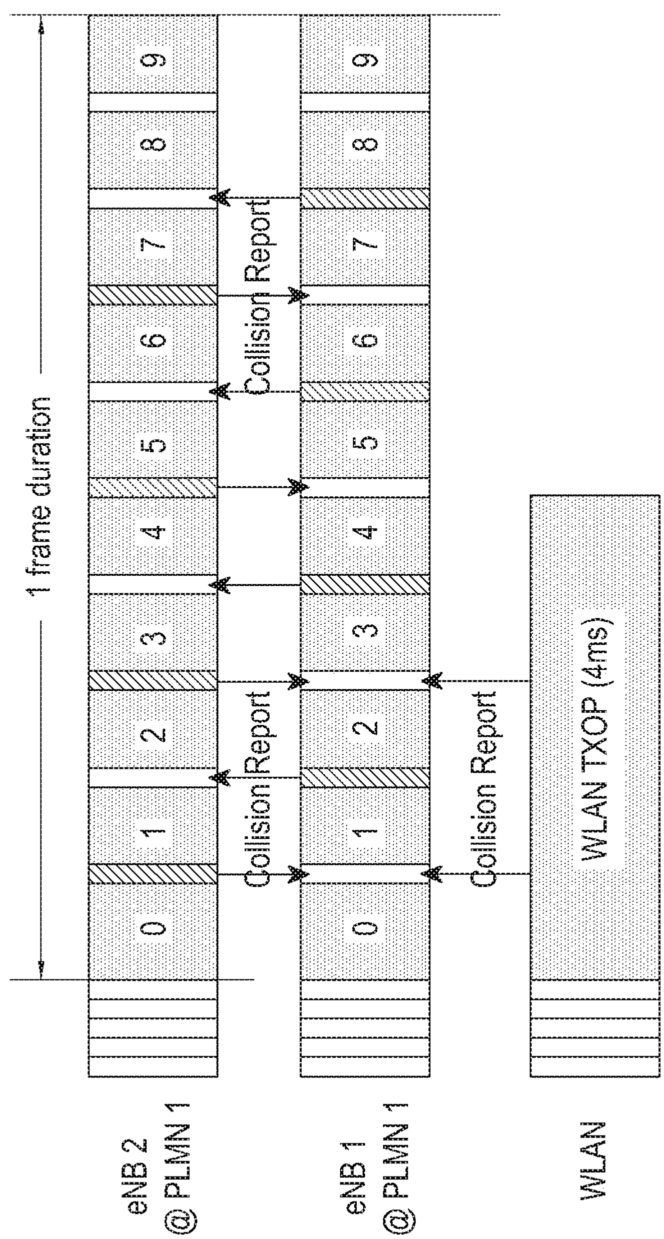
FIG. 9 is a view illustrating an example of an operation for detecting a channel occupation based on a channel occupation result detected in a measuring time slot of a neighboring eNB according to an embodiment of the present disclosure.

FIG. 9 is a view illustrating an example of an operation for detecting a channel occupation based on a channel occupation result detected in a measuring time slot of a neighboring eNB according to an embodiment of the present disclosure.

Referring to FIG. 9, measuring time slots, which are slots 1 and 3, that are different from the measuring time slots 2 and 4 of the eNB 1 are allocated to the eNB 2 which is a neighboring eNB of the eNB 1. Even in this case, each of eNB 1 and eNB 2 shares the measuring time slot thereof. Thus, a corresponding eNB does not transmit a signal a measuring time slot of another eNB. In the case of FIG. 9, it is assumed that the neighboring eNB 2 detects a signal in the measuring time slots 1 and 3 thereof, and detects a channel occupation. In addition, the neighboring eNB 2 reports a result of the detection of the channel occupation to the eNB 1 in a corresponding measuring time slots 1 and 3. Then, the eNB 1 may configure the channel occupation detection result of the neighboring eNB 2 as the triggering condition, and may increase the q value. According to an embodiment of the present disclosure, the eNB or the transmitting device may compare CCA measurement results at different time points, to determine the triggering condition for controlling the q value.

Figures 10A, 10B:
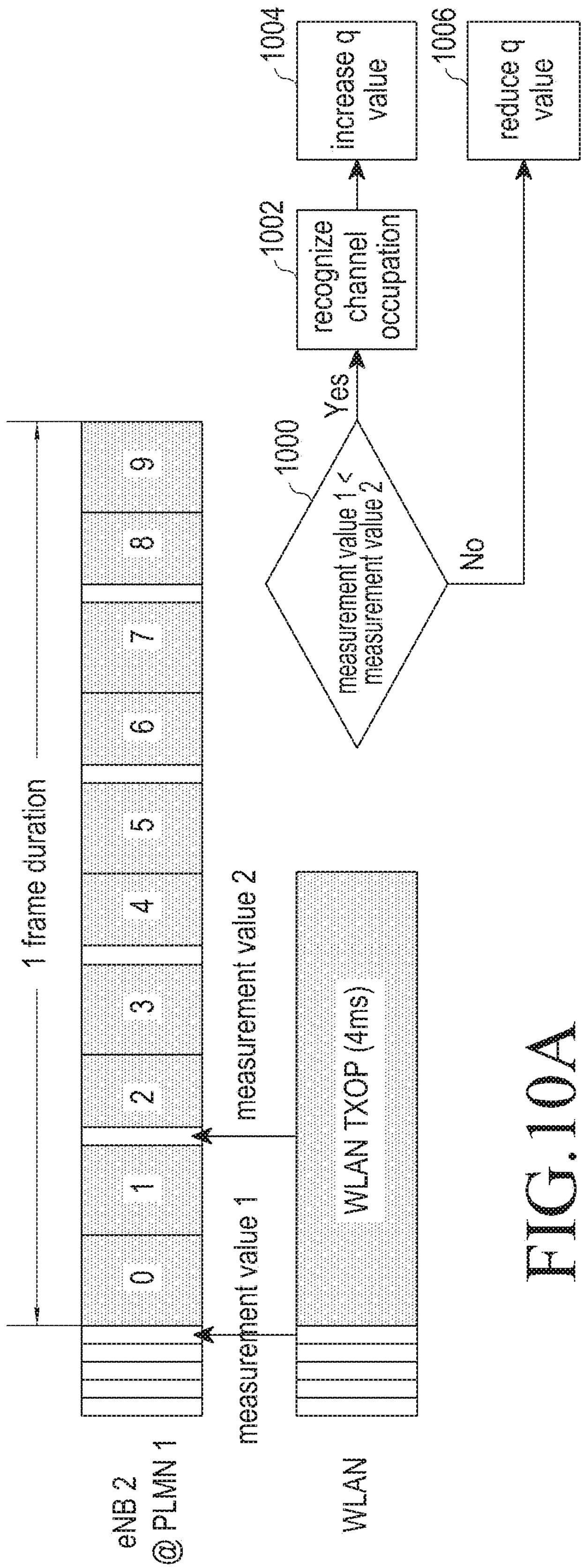
FIGS. 10A and 10B are examples of an operation in which an eNB determines a triggering condition for controlling a q value using clear channel assessment (CCA) measurement results at different time points according to an embodiment of the present disclosure.

FIGS. 10A and 10B are examples of an operation in which an eNB determines a triggering condition for controlling a q value using CCA measurement results at different time points according to an embodiment of the present disclosure.

Referring to FIGS. 10A and 10B, in operation 1000, for example, the eNB compares a CCA measurement result (i.e., a measurement value 1) before an entrance of the transmission period, according to an embodiment of the present disclosure, with a result (i.e., a measurement value 2) measured in a previously allocated measuring time slot 2. As a result of the comparison, when the measurement value 2 corresponding to reception power/energy value measured in the measuring time slot 2 is larger than the measurement value 1, the eNB may know that a signal of a wireless LAN or another operator is generated after the entrance of the transmission period. Then, in operation 1002, the eNB detects a generation of the channel occupation, and in operation 1004, the eNB increases the q value. As a result of the comparison, when the measurement value 2 is equal to, or smaller than, the measurement value 1, in operation 1006, the eNB reduces the q value. Alternatively, according to an embodiment, when larger reception power/energy value is obtained in a next measuring time slot by comparing CCA measuring results in one measuring time slot and a next measuring time slot, the eNB may know that a signal of a wireless LAN or another operator is generated between two measuring time slots. In addition, the eNB increases the q value in the next transmission period based on this.

According to another further embodiment in which information on whether the channel is occupied in a specific time point is configured as the triggering condition, the eNB may control the q value based on reception power/energy value during a predetermined time just after the transmission period is ended. When the transmitting device performs and finishes the transmission at the time same as that of another operator device, an end of a predetermined transmission period may be determined between the same operator devices. A defer period when no operation is performed for a predetermined time just after the transmission time is ended may be configured. Usually, in order to protect a normal wireless LAN, the length of the defer period may be configured by the eNB or may be determined in advance.

Figure 11:
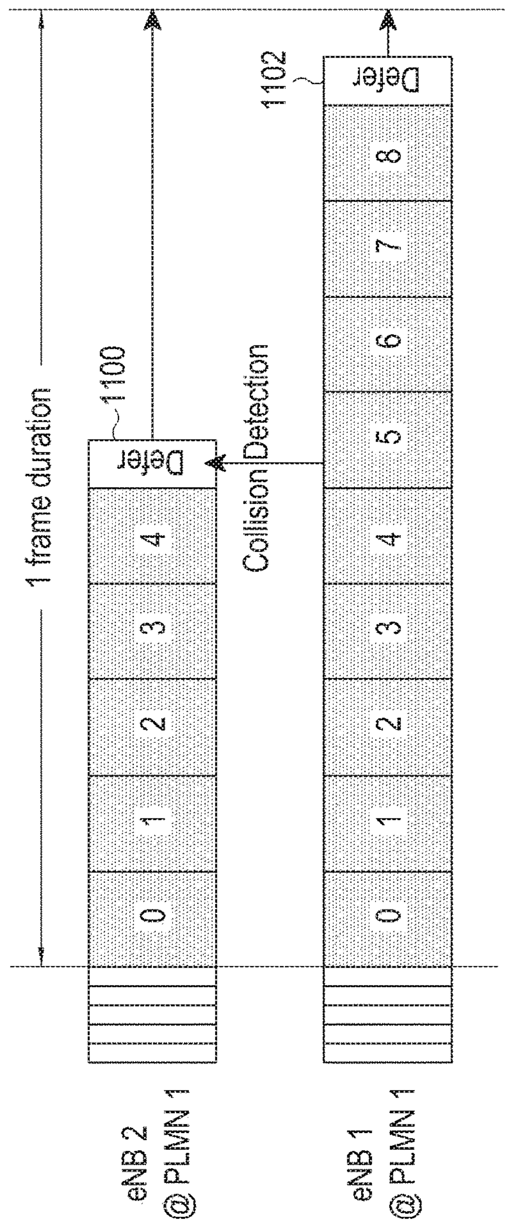
FIG. 11 is a view illustrating an example of an operation in which an eNB detects a channel occupation in a defer period according to an embodiment of the present disclosure.

FIG. 11 is a view illustrating an example of an operation in which an eNB detects a channel occupation in a defer period according to an embodiment of the present disclosure.

Referring to FIG. 11, for example, it is assumed that each of eNB 1 and eNB 2 configures respective defer periods 1100 and 1102 as 40 usec, and the transmitting device performs an ED during this period. In the case of the downlink, the eNB 2 performs the ED in the defer period 1100. The eNB 2 calculates a representative value that is equal to an average value or a maximum value of the energy measured in the defer period 1100. When the representative value is higher than a specific threshold value, the eNB directly increases the q value for the next CCA. In the case of the uplink, the UE performs the ED in a corresponding defer period. The UE calculates a representative value that is equal to an average value or a maximum value of measured energy. When the representative value is higher than a specific threshold value, the UE recognizes that a channel occupation is generated, and reports this to the eNB. Then, the eNB increases the q value for the next CCA, according to the reception of the report.

3. A Triggering Condition Combination from a View of Transmitting and Receiving Devices As described above, when the q value is controlled based on the result measured from the view of the transmitting device, a vagueness in which the ACK/NACK feedbacks from a plurality of receiving devices are connected to one transmitting device may be removed. However, the result measured from the view of the transmitting device has disadvantages in which it is difficult to know a collision circumstance accurately, when an interference device for the receiving device is out of a measurement range of the transmitting device. Thus, an embodiment of the present disclosure proposes a method of controlling the q value in consideration of the triggering condition from the view of the transmitting device together with the triggering condition from the view of the receiving device. In the case of an uplink UE receiving a direction a resource allocation from the eNB, since a transmission is performed after a minimum of 4 ms from the directed time point, it is difficult for the eNB to know whether the UE succeeds the CCA in the future in advance. Thus, since the eNB cannot determine the ACK/NACK feedback at an uplink reception time point, the UE should informs of the success or failure of the CCA after the CCA, but this causes another further delay. Therefore, in an embodiment of the present disclosure, the eNB feeds the ACK/NACK feedback for the uplink back to the UE. Then, the UE may identify the success or failure of the CCA, may configure the ACK/NACK feedback for the case of the success of the CCA among the ACK/NACK feedbacks for the uplink, as the triggering condition, and may control the q value.

Other Problems

An Operation of an Uplink

In a design of a cellular communication operated in the shared/unlicensed band, it is difficult to control the uplink. Basically, in the cellular communication, the UE may report a measurement result to the eNB, but since the eNB performs most of control operations, when the UE performs an operation such as the ECCA, the performance may be conflicted with a resource allocation and a scheduling method of the existing cellular communication. However, it is difficult for the existing method controlled by the eNB to satisfy regulation requirements for a resource access operation according to each UE. Thus, an embodiment of the present disclosure proposes a method divided according to whether a main object controlling the q value or a BO value for the ECCA is the UE or the eNB.

The case of the control of the UE:

According to an embodiment of the present disclosure, it is assumed that the UE selects a Back-Off (BO) counter value N for the ECCA operation as a value of a CCA window [0, q]. The q value may be directly determined by the UE, or may be configured by a direction of the eNB. In this case, the UE reports, to the eNB, a subframe index in which the selected initial BO counter N value, or the BO counter is expected to be zero. When the eNB performs the scheduling, the eNB may receive, from the UE, the initial BO counter N value reported from the UE, and the success or failure for each CCA. The eNB may select the UE to be included in the scheduling based on a current BO count n value. Here, the current BO count n value is an updated value from the BO counter values according to each counter, which are stored in the eNB. For example, the eNB may select the UEs in a sequence of a low remaining BO counter value to include the UE in the scheduling. According to an embodiment, instead the UE report, to the eNB, the success or failure for each CCA, the UE should report, to the eNB, the remaining BO counter value every specific period or according to a direction of the eNB.

The case of the control of the eNB:

According to an embodiment of the present disclosure, the eNB may configure the q value based on the q value report according to each UE, and may direct the use of the configured q value to all UEs or a specific UE. At this time, the UE may report, to the eNB, the q value increase triggering condition based on a CCA operation related variable. The eNB may determine the UEs to be included in the scheduling in a specific time point in consideration of updated q values corresponding to each UE. According to an embodiment of the present disclosure, the eNB may determine a representative q value based on the q value of at least one UE to which a resource is allocated in one burst by the scheduling, and may direct the use of the representative q value to the UEs to which the resource is allocated. Then, the UE generates the BO counter value N between [0, q] using the q value designated by the eNB.

According to another embodiment, the UE performs the control operation for the q values corresponding to each UE, and the UE reports, to the eNB, the BO counter N value generated between [0, q] according to the q value. Then, according to another embodiment of the present disclosure, the eNB determines the representative N value based on the N value reports of the UEs to which the resource is allocated in one burst by the scheduling, and the eNB directs the use of the representative N value to the UEs to which the resource is allocated in the burst.

According to an embodiment, an approach A in which the eNB controls the BO counter of the UE with the UL grant, and an approach B in which the UE controls the BO counter before the UL grant are proposed.

Figure 12:
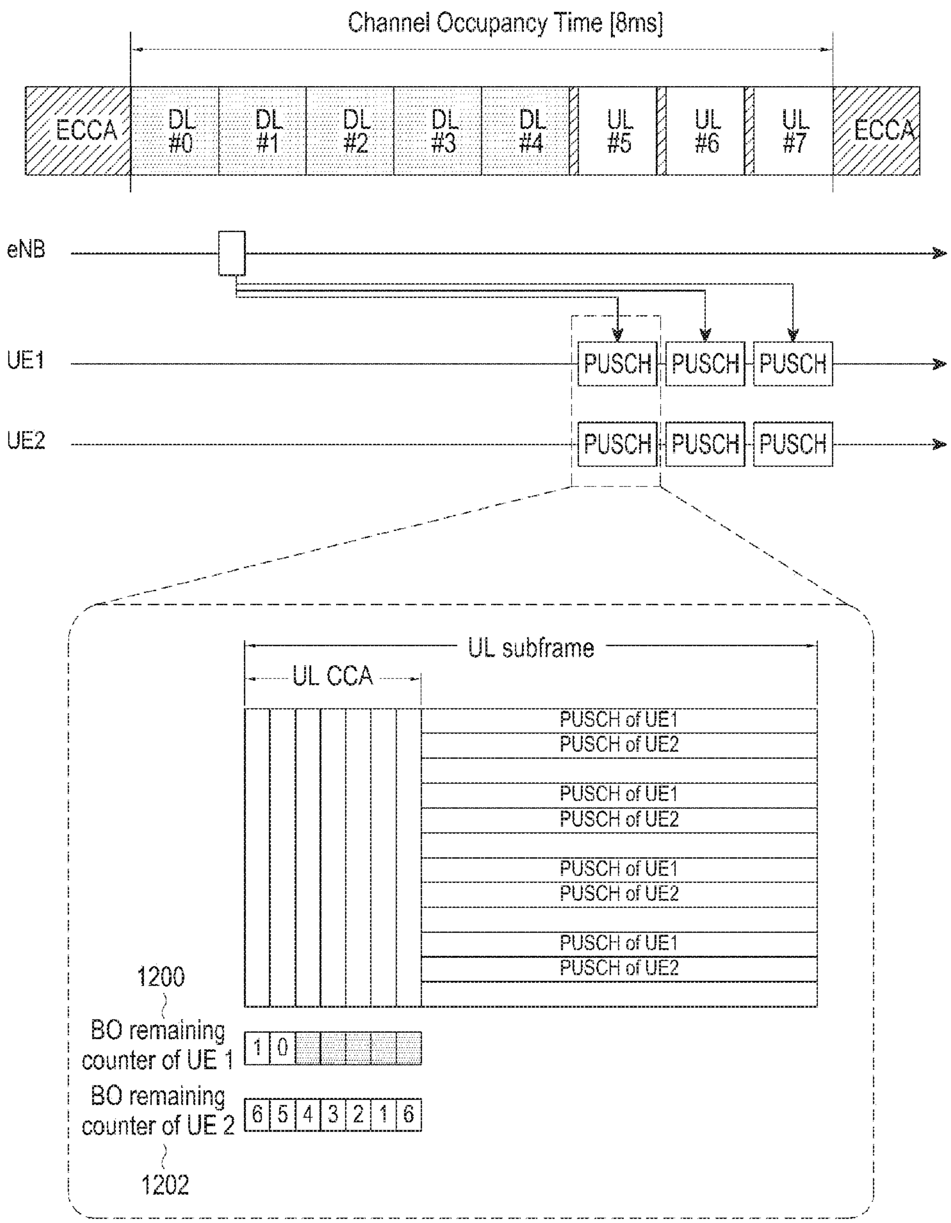
FIG. 12 is a view illustrating an example of an approach A in which an eNB controls a Back-Off (BO) counter of a UE with an uplink (UL) grant according to an embodiment of the present disclosure.

FIG. 12 is a view illustrating an example of an approach A in which an eNB controls a BO counter of a UE with a UL grant according to an embodiment of the present disclosure.

Referring to FIG. 12, a common problem generated due to a difference of the BO counter values of the UE 1 and the UE 2 when a plurality of UEs, for example, the UE 1 and the UE 2 are allocated to one subframe having a CCA gap is shown. FIG. 12 shows that the UE 1 and the UE 2 are scheduled to one subframe, but a remaining BO counter value 1200 of the UE 1 is 2, a remaining BO counter value 1202 of the UE 2 is 7, and thus the remaining BO counter values are different. As a result of this, when the UE 1 identifies that the channel is not occupied in two CCA slot, since the UE 1 does not reach a UL subframe boundary yet, the UE 1 may promptly transmit a reservation signal to the eNB. Next, when the UE 1 transmits a reservation signal and thus the UE 1 reaches the UL subframe boundary, the UE 1 transmits a UL PUSCH signal to the eNB. In contrast, the UE 2 identifies that the channel is not occupied seven CCA slots, reaches a PUSCH transmission time point, and transmits the UL PUSCH signal without the reservation signal.

As described above, according to a difference of the BO remaining counter values of the UE 1 and the UE 2, a problem generated when the CCA is performed based on a transmission timing of a corresponding UE determined, according to 1) a UL timing (i.e., Timing Advance (TA)=T1) of the eNB, 2) a DL timing (i.e., TA=0) of the eNB, and a median value (i.e., TA=T1/2) between the UL timing and the DL timing of the eNB is described.

The following Table 1 shows descriptions of a DCI format 0 transmitting the UL grant required to an UL embodiment of the present disclosure. Some fields are additionally required information compared to the existing DCI format 0. According to an embodiment, it may be operated according to at least one among pieces of the additionally required information.

TABLE 1

| Field | Length (Bits) | |
|---|---|---|
| Flag for format0/format1A differentiation | 1 | |
| Hopping flag | 1 | |
| N_ULhop | 1 | 1.4 Mhz |
| | 1 | 3 Mhz |
| | 1 | 5 Mhz |
| | 2 | 10 Mhz |
| | 2 | 15 Mhz |
| | 2 | 20 Mhz |
| Resource block assignment | 5 | 1.4 Mhz |
| | 7 | 3 Mhz |
| | 7 | 5 Mhz |
| | 11 | 10 Mhz |
| | 12 | 15 Mhz |
| | 13 | 20 Mhz |
| MCS and RV | 5 | |
| NDI (New Data Indicator) | 1 | |
| TPC for PUSCH | 2 | |
| Cyclic shift for DM RS | 3 | |
| UL index (TDD only) | 2 | |
| Downlink Assignment Index (DAI) (TDD only) | 2 | |
| CQI request (1 bit) | 1 | |
| (Add) CWS (=q) | | |
| (Add) Backoff Counter (BO counter) | | |
| (Add) Tx offset (PUSCH transmission time point) | | |
| (Add) Last CCA index (last CCA slot index) | | |

Approach A: A Method of Controlling a BO Operation in a Burst

As described above, when a plurality of UEs are scheduled in the same UL subframe, the same UL subframe group, or the same UL burst, the BOs between UEs are ended at different times in the CCA period. Therefore, in order to resolve a problem of a generation of a blocking between UEs, an embodiment of the present disclosure proposes a method in which the eNB controls the BO counter of the UE in the burst with the UL grant.

Option 1: According to an embodiment of the present disclosure, when the eNB transmits the UL grant, the eNB may configure a common BO value for one subframe.

Option 2: According to another embodiment, when the eNB transmits the UL grant, the eNB may configure a common BO value for a plurality of subframe groups. According to an embodiment, the common BO value may be configured such that the common BO value is updated every time corresponding to each subframe. Alternatively, according to an embodiment, the common BO value may be configured such that the common BO value is used in a first subframe, and a minimum value (or lower BO value configured by the eNB) is used from the next subframe. In addition, according to an embodiment, the common BO value may be configured such that the common BO value is used in the first subframe, and gradually reduced (e.g., reduced one by one) BO values are used every next subframe.

Option 3: According to an embodiment of the present disclosure, when the eNB transmits the UL grant, the eNB may configure a common q value for the plurality of UEs, and the UE may configure one BO value in [0, q] according to a rule having a pseudo random for one subframe. Here, since the rule should be the same between the UEs, for example, a time variable commonly informed to the UE, such as a subframe index may be used as a seed variable.

Option 4: According to an embodiment of the present disclosure, option 4 may be formed of a combination of option 3 and option 2 described above. Specifically, when the eNB transmits the UL grant, the eNB configures the common q value for the plurality of UEs, and the UE configures one BO value in [0, q] according to a rule having a pseudo random for a plurality of subframe groups. Since the rule should be the same between the UEs, a time variable commonly informed to the UE, such as a subframe index, a subframe group index, a burst index may be used as a seed variable. In an embodiment of the present disclosure, in order to comply with the regulations, a common BO counter value allocated to the UE in any subframe should be configured as the maximum value among the BO counter values of the UEs.

Option 5: According to an embodiment of the present disclosure, the eNB informs of any timing among CCA slots to the UE regardless of the remaining BO counter value of the UE. Then, the UE reduces the remaining BO counter in the CCA slot of which the channel is vacant as a result of the LBT. When the time does not reach the timing, if the remaining BO counter is zero, the UE waits until the timing rather than performing the transmission promptly. This operation is referred to as an implicit deferring or a self-deferring. The UE of which the remaining BO counter is not zero until the time reaches the timing may 1) continuously perform the BO operation by maintaining the remaining BO counter value in the next CCA period, or may 2) start the BO operation again in the next CCA period by newly updating the BO value. According to an embodiment, when the time reaches the CCA slot timing designated by the eNB, the reservation signal may be transmitted to prevent an occupation of another device.

Approach B: A Method of Performing a BO Operation Before Burst

The UL CCA period included in one subframe is a period of about 1 symbol of the OFDM, and the UL CCA period includes about 7 CCA slots having the length of 9 us. Thus, it is suitable for the LBT UE which performs one short CCA according to the method of FIG. 1A, or a UE having a high traffic priority and thus having a q value of a small range. Referring to the following Table 2, when the LBT priority 1 is excluded, since a range of the usable q value is seven or more, stochastically, the probability in which the LBT fails in seven CCA slots included in the UL subframe is high. A max channel occupancy time (MCOT) is the successively transmittable length of resource when the channel is secured once according to the LBT priority. Thus, for the UE of which the LBT priority is low, or the UE (e.g., the UE having a BO counter value larger than 7) of which the BO counter value cannot end the LBT in one UL subframe, an embodiment of the present disclosure proposes a method of performing the BO operation before the UL grant is received from the eNB.

TABLE 2

| LBT priority class | CWmin | CWmax | MCOT | Set of CW sizes |
|---|---|---|---|---|
| 1 | 3 | 7 | 2 ms | {3, 7} |
| 2 | 7 | 15 | 3 ms | {7, 15} |
| 3 | 15 | 63 | 10 or 8 ms | {15, 31, 63} |
| 4 | 15 | 1023 | 10 or 8 ms | {15, 31, 63, 127, 255, 511, 1023} |

Figure 13:
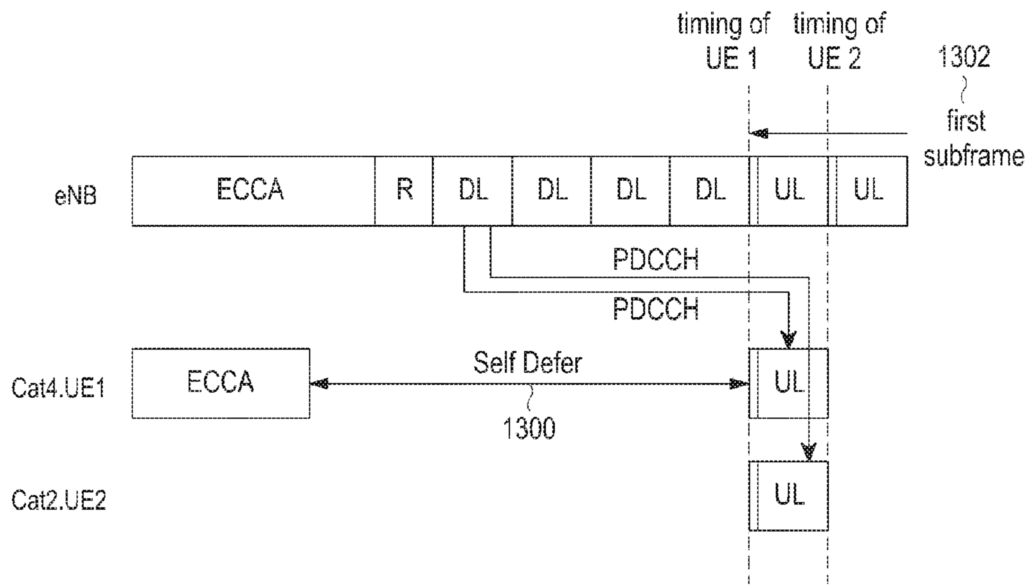
FIG. 13 is a view for describing an example of an operation in which an eNB schedules a UL resource to two UEs period according to an embodiment of the present disclosure.

FIG. 13 is a view for describing an example of an operation in which an eNB schedules a UL resource to two UEs period according to an embodiment of the present disclosure. Here, among two UEs, the UE 1 corresponds to a category 2 (hereinafter, referred to as ‘Cat2’) performing the CCA according to FIG. 1A. Among two UEs, the UE 2 corresponds to a category 4 (hereinafter, referred to as ‘Cat4’) performing the ECCA according to FIG. 1B.

Referring to FIG. 13, for example, it is assumed that since the Cat4 UE 1 has a priority class 4, the q value is increased to 63, the eNB selects 45 as the BO counter value in [0, 63] range for the Cat4 UE, and the eNB transfers the BO counter value to the Cat4 UE. It is assumed that the Cat2 UE 2 has a priority class 2, the q value is 7, the eNB selects 5 as the BO counter value in [0, 7] range for the Cat2 UE 2, and the eNB transfers the BO counter value to the Cat2 UE 2. As shown in FIG. 13, when the eNB controls both of the q value and the BO counter value for each UE, in order to perform a transmission in the UL subframe when the Cat4 UE 1 receives the grant, the transmission is possible only in the case in which the Cat4 UE 1 has the remaining BO counter value equal to or smaller than seven. Thus, according to an embodiment of the present disclosure, the Cat4 UE 1 may reduce previously having BO counter value before a start of the DL burst. That is, according to the ECCA procedure, as a result of a sensing, whenever there is a vacant CCA slot, the UE reduces the BO counter value one by one in a corresponding CCA slot. When the remaining BO counter value of the Cat4 UE 1 is equal to or smaller than seven, the Cat4 UE 1 may perform a self-deferring operation in a reference numeral 1300, and may not reduce the BO counter. Alternatively, according to an embodiment, when the remaining BO counter value reaches zero, the Cat4 UE 1 may not start the transmission, may perform a self-deferring, and may delay the transmission. When the Cat4 UE 1 identifies the position of the UL subframe allocated in this UL burst from the UL grant received from the eNB, the Cat4 UE 1 may 1) exhaust the remaining BO counter in a corresponding CCA period and promptly perform the transmission at the PUSCH transmission timing, 2) wait until the PUSCH transmission timing and promptly perform the transmission, or 3) wait until the PUSCH transmission timing—CCA slot length, perform the last CCA and perform the transmission.

Figure 14:
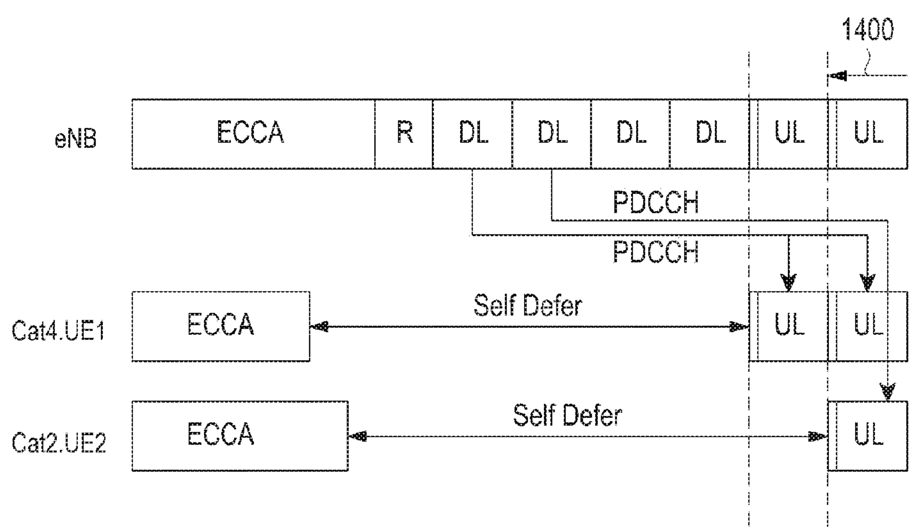
FIG. 14 is a view for describing an example of an operation for a UL scheduling to two UEs of which remaining BO counter values are different according to an embodiment of the present disclosure.

FIG. 14 is a view for describing an example of an operation for a UL scheduling to two UEs of which remaining BO counter values are different according to an embodiment of the present disclosure.

Here, it is assumed that both of two UE 1 and UE 2 correspond to the Cat4 UE. In the case of Cat4 UE, the Cat4 UE is operated with the ECCA in the first subframe of the UL burst and thus performs the transmission. In the following successive UL subframe, the Cat4 UE performs only a short CCA (that is, Cat2. LBT method). When the channel is vacant, the Cat4 UE may perform the transmission in the following PUSCH resource. Thus, referring to FIG. 14, as described above, the Cat4 UE 1 may start the transmission after exhausting the remaining BO counter value that remains as the self-deferring operation in the ECCA period in the first UL subframe. The Cat4 UE 1 may configure a BO counter value for the Cat2 LBT configured by the eNB and may be operated from the second UL subframe. In the case of the Cat4 UE 2, since a second subframe of the UL burst is a first UL subframe of this UE, the Cat4 UE 2 exhausts the remaining BO counter value and performs the transmission, in a method in which the self-deferring is performed in the Cat4 LBT, equally to the operation of the UE 1 in the first subframe. Thus, in FIG. 13, as the Cat4 UE 1 and the Cat2 UE 2 perform the UL transmission together in the first subframe 1302, even in an embodiment of FIG. 14, the Cat4 UE 1 and the Cat4 UE 2 may perform the UL transmission together in a second subframe 1400. In order to support the above-mentioned operation, the UE according to an embodiment of the present disclosure may trigger the BO operation according to one of the following conditions. Among these, in a condition in which a signal of the eNB is received, the eNB may configure the q value or the BO counter value additionally. Otherwise, the UE may generate the BO counter value based on the q value determined according to the LBT or the traffic priority. In another embodiment, the eNB may configure the q value necessary to generate the BO counter value by the UE.

1) The time when a UL bearer is established between the UE and the eNB,

2) The time when the uplink traffic is generated in the UE and the UL transmission request is arrived from an upper layer, 3) The time when the uplink traffic is generated in the UE, the UL transmission request is arrived from an upper layer, and an SR is transmitted to the eNB, 4) The time when the UE transmits the SR to the eNB, and the UE receives the grant from the eNB, 5) The time when the UE transmits a BRS for the grant of the eNB, 6) The time when the ACK is received through a Physical Hybrid ARQ Indicator Channel (PHICH) for the BSR.

A process for determining the q value in the triggering condition of the above-mentioned BO, according to an embodiment of the present disclosure, is the same as following. The q value is started from an initial value CWmin. When any transmission is determined as a collision circumstance, the q value increases every twice. Thus, the UE may perform the ECCA according to a start condition of the ECCA operation, which is an operation for generating the BO counter value and for sensing the channel based on the initial q value determined by a network or determined by the UE. When the transmission condition is satisfied, that is, when the BO counter value becomes zero, the data may be transmitted. When the UE satisfies at least one among the following conditions before the UE receives the UL grant from the eNB, the UE may maintain the BO counter value (i.e., enters in the self-deferring state), and may report this to the eNB. 1) when the BO counter value becomes zero, 2) the BO counter value is equal to, or smaller than, the k value capable of performing a fast LBT, for example, when the k value is seven, the UE may performs the LBT in a vacant channel, and may identify whether the BO counter value becomes seven. The k value may be configured by the eNB through the grant or a common control signal.

According to an embodiment of the present disclosure, in performing the LBT in the ECCA preferentially, a period when the BO counter value may be reduced and a period (i.e., a deferring period) when the BO counter value may not be reduced may be configured according to the following rules.

A period when the BO counter of the UE may be reduced: (perform in at least one period)

- A period when a reference signal (e.g., a CRS and the like) of the eNB is not received and a channel is vacant
- A period when an ending partial subframe is not used, which is directed by the eNB through the common DCI (e.g., the number of the OFDM symbols used in the common DCI is expressed)
- A period when the CCA gap is possible of the UL burst period informed to the UE commonly or individually by the eNB.
- An expanded UL subframe duration for the UL data reception by the eNB.

A BO counter deferring period of the UE: (perform in at least one period)

- A DL burst period (divided into a PDCCH detection and an end DL subframe indicator (L1))
- A PUSCH period of the UL burst (i.e., A period except for the CCA gap for the LBT in the UL subframe)

Cross-Burst Scheduling

In the shared/unlicensed band, for an effective co-existence with another communication device, a resource may be allocated in forms of the DL burst (i.e., successive DL subframe group) and the UL burst (i.e., successive UL subframe group). However, in a cellular mobile communication, when the eNB allocates the UL grant for controlling the transmission of the UE in the DL subframe, a delay time of 4 ms is taken. Due to this delay time, an inefficiency of the resource allocation may be generated.

Figure 15A:
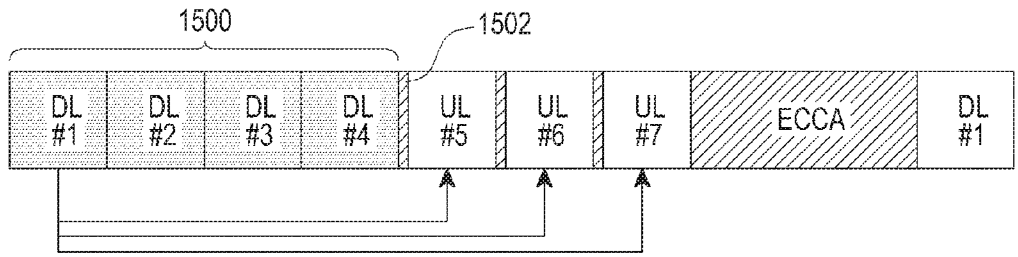
FIG. 15A is a view for describing an example of a delay time generated due to an allocation of a UL grant in a downlink (DL) subframe according to an embodiment of the present disclosure.

FIG. 15A is a view for describing an example of a delay time generated due to an allocation of a UL grant in a DL subframe.

Referring to FIG. 15A, for example, when the DL subframe is four (1500), when the DL burst is ended and the UL burst is connected, since there is only a CCA period corresponding to a short one-shot 1502, the probability in which another device secures a channel is low.

Figure 15B:
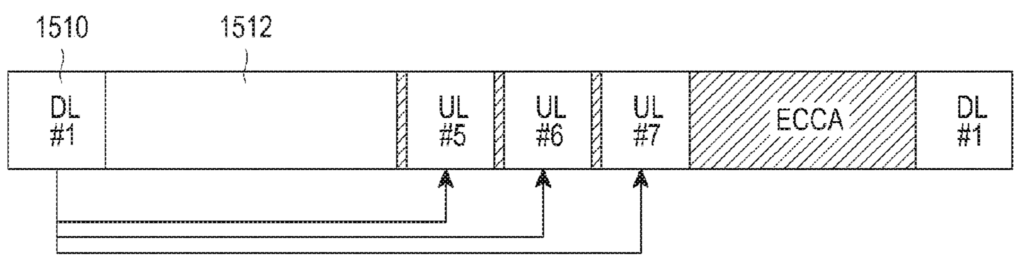
FIG. 15B is a view illustrating the case in which a plurality of subframes are included between a DL subframe and a UL subframe according to an embodiment of the present disclosure.

FIG. 15B is a view illustrating the case in which a plurality of subframes are included between a DL subframe and a UL subframe.

Referring to FIG. 15B, when the DL subframe is one 1510, a period 1512 of the length of three subframes is vacant between the DL subframe and the UL subframe. Thus, a transmission chance may be provided to another device. In this case, a UL transmission chance may not be obtained at all. Due to the plurality of subframes positioned between the DL subframe and the UL subframe, in order to prevent a circumstance in which the UL transmission chance may be lost, according to an embodiment of the present disclosure, the eNB may use a cross-burst scheduling method which allocates a resource in the next burst in advance. Specifically, the eNB may inform of the position of the last DL subframe, in the last DL subframe forming the DL burst, or a DL subframe before the last DL subframe by one. By using this, the eNB may direct, to the eNB, the grant of the UL resource from the UL subframe following to the last DL subframe in the next burst after this burst. Thus, differently from a normal grant, an offset between the grant time point and the UL data transmission time point is not specified. In order to support such a characteristic, first, like #0, #1, and #2, the UL subframe is numbered to be allocated from #0. The last DL subframe is identified later. The temporarily allocated UL subframe information is matched from the next subframe, and thus the UE may interpret it. According to another embodiment, when the existing normal UL grant and the cross-burst UL grant are not divided definitely, and the UL data transmission for this burst according to the normal UL grant is failed due to a complexity of the channel, it may perform a method of automatically changing it into the cross-burst UL grant. Alternatively, according to another embodiment, the cross-burst UL grant may be transmitted in the PCell (i.e., licensed band) rather than the SCell (i.e., shared band) of the eNB. According to another further embodiment, when the cross-burst UL grant fails in any burst, the eNB may direct more continuous attempt until N burst, to the UE. According to an additional embodiment, the cross-burst UL grant may be directed for a plurality of carriers rather than one carrier. In addition, according to an embodiment, for the plurality of carriers, a procedure for detecting a signal of the eNB may be performed by the UE according to a direction of the eNB, or may be performed by a priority determined by the UE.

Figure 15C:
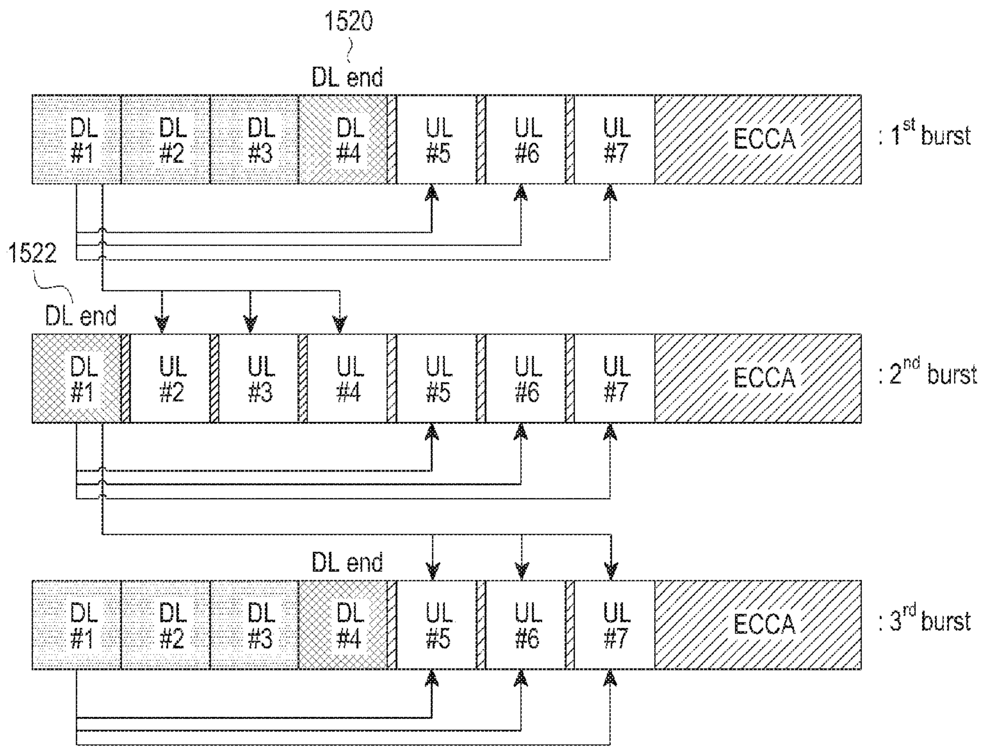
FIG. 15C is a view illustrating an example of embodiments in which a UE detects a signal of an eNB according to an embodiment of the present disclosure.

FIG. 15C is a view illustrating an example of embodiments in which a UE detects a signal of an eNB according to an embodiment of the present disclosure.

Referring to FIG. 15C, the UE may perform the UL data transmission according to the cross-burst UL grant, based on 1) the last DL subframe 1520 of the DL burst which is found the fastest, or 2) the last DL subframe 1522 which is found the fastest.

Meanwhile, in an embodiment of the present disclosure, when information granted in the DL of a previous burst and information granted in the DL of this burst are conflicted, the UE is configured to select one according to a rule according to an embodiment of the present disclosure.

Option 1: the UE follows the BO, q value and transmission timing value identified from the grant which is previously received. In this case, a limit is generated in a configuration of the BO value or the q value of UEs, which is allocated by the eNB later.

Option 2: the UE follows the BO, q value and transmission timing value identified from the grant which is later received. In this case, the eNB should overwrite the grant information by allocating the grant information to the UE to which the grant information is previously allocated, and thus a grant load may be increased.

Option 3: the UE may compare the BO value or the q value included in a previously received grant and a later received grant, and may use a larger value among each of values. When the transmission timing is separately configured in a corresponding grant, the UE follows the later transmission timing among the transmission timings included in the previously received grant and the later received grant.

A Method of Controlling a Resource Access Related Variable in Semi-Dynamically by the eNB The eNB according to an embodiment of the present disclosure may control a variable configuring the exponential back-off algorithm individually or equally for a plurality of eNB groups. The variable configuring the exponential back-off algorithm according to an embodiment of the present disclosure is a minimum value and a maximum value of a window for selecting a random value N for the ECCA, a CCA threshold value, the length of the deferring period, the triggering condition for increasing/reducing the q value, and the like. The eNB may control the variables such that the variables of the eNB and a neighboring eNB are the same together with the neighboring eNB through an X2 interface. Alternatively, the eNB may perform an operation for equalizing the variable by receiving a signal from the neighboring eNB. The neighboring eNB may inform of a specific index to the signal, and thus the neighboring eNB may control a corresponding variable value according to a variable set that is previously determined according to each index. The control for the plurality of eNB groups may be applied to the plurality of eNBs positioned in the same site, that is, including the Pcell and the Scell. In addition, according to an embodiment, the eNB may apply the uplink to all UEs granted in one UL burst, or may apply the uplink to all UEs granted in one UL subframe. To this end, the eNB may transmit a common signal or a dedicated control signal corresponding to each UE in L1, or may control it through the MAC CE, or the RRC message.

A Method of Changing DL/UL Period in a TDD Frame Structure

When a DL traffic amount is lower than a predetermined DL period, an advance of a UL period start may help use a resource effectively. However, for the UL period, the UE receiving a resource allocation from the eNB should perform an Initial CCA (ICCA) or the ECCA operation for a resource occupation before a performance of an actual uplink transmission. In the case of the ICCA operation, the ICCA period is allocated in a start of the allocated UL subframe, and a transmission-or-not is determined according to a success or failure of the CCA. However, in the case of the ECCA, when the eNB signal is detected in the CCA period, it is in a freezing state, and thus a method for removing reception power/energy of a belonging eNB signal is necessary. To this end, in an embodiment of the present disclosure, the UE receives an initial signal transmitted before the DL period start or a reference signal transmitted from the eNB in the DL period, and the UEs allocated to the uplink separately store the measured reception power/energy. In addition, the eNB transmits a signal informing of an end of the DL period and performs the ECCA until the UE receives the signal. The eNB excludes the reception power/energy value of the eNB signal from reception power/energy value of the whole signal. During the changed ECCA operation, the UE reduces the CCA counter. Only a UE of which the CCA counter becomes zero performs the uplink transmission before the UE reaches a resource which is allocated to the uplink. In further another example, the UE adjusts an ECCA start time point such that the CCA counter becomes zero at the uplink allocation time point. Since the CCA counter may not be adjusted to be zero if the remaining time from the time point when the channel occupation is ended lastly to the uplink allocation time point of the UE is shorter than the remaining ECCA time, the UE is operated equally to that of the existing ECCA. Meanwhile, when the UE receives a signal that informs of the end of the DL period, a start of the UL period is configured again based on the time point corresponding to the end of the DL period. Regarding the resource allocation for the uplink of the eNB, an allocation resource position should be informed using a comparative index value from the UL period start rather than an absolute index value of the subframe, too.

A Method of Utilizing of a Channel Occupation End Signal

When the eNB performs a signal transmission in a successive subframe and at the occupied channel, and the eNB reaches a maximum occupation section or there is not data to be transmitted, the eNB may stop the transmission. In this case, according to an embodiment of the present disclosure, the eNB transmits a signal informs of an end of the channel occupation to a neighboring eNB or the UE, and thus, it may help in determining reliability of a following CCA, a channel state measurement, and a complexity measurement. Meanwhile, according to an embodiment, the eNB may inform of the timing for time alignment of the channel occupation end signal in advance. Therefore, the simultaneous transmission between the eNBs is possible, and thus a frequency recycling index may be improved.

Figure 16:
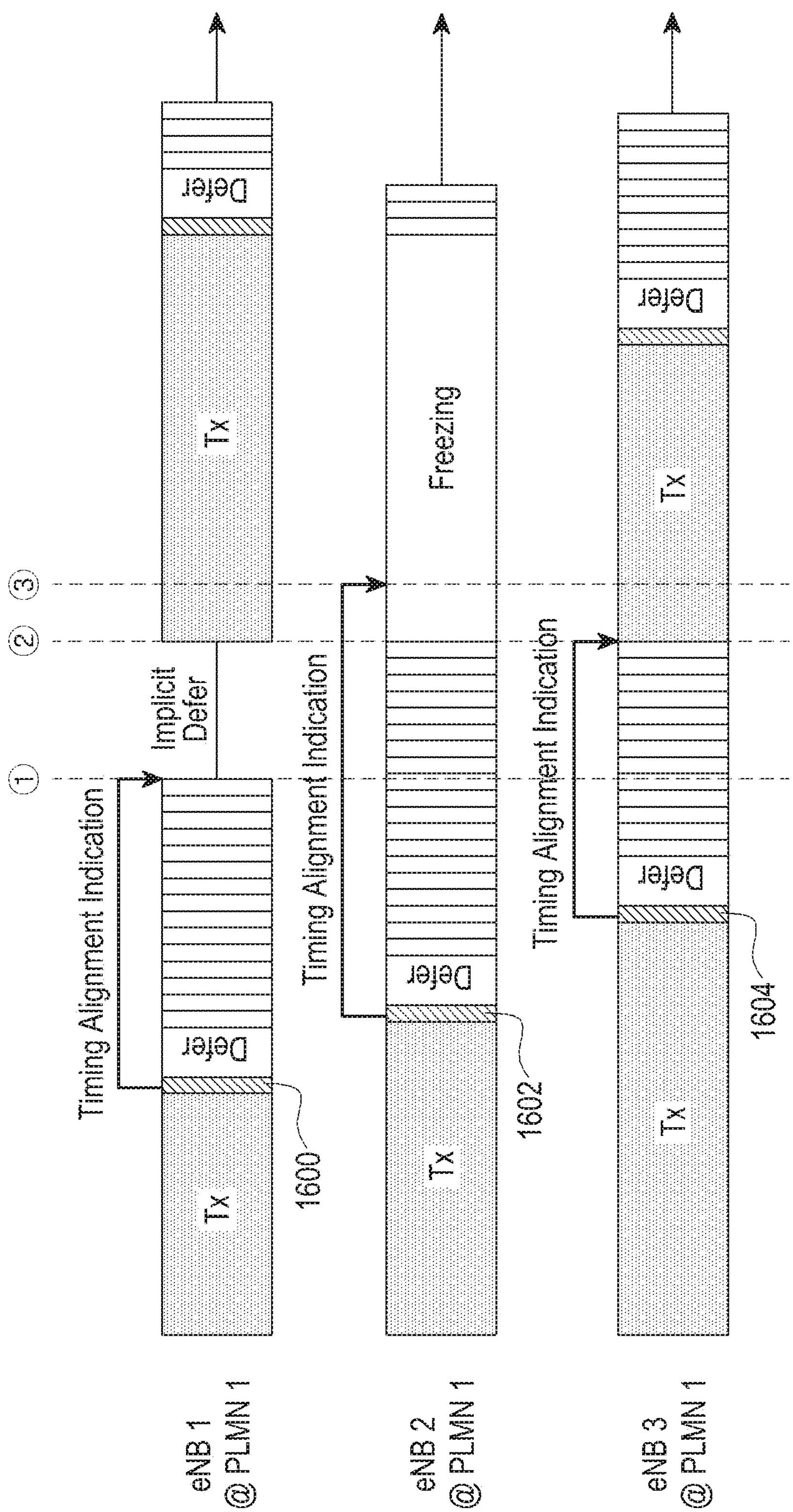
FIG. 16 is a view for describing an example of an operation in which an eNB directs a channel occupation end signal and a time alignment for a frequency recycling according to an embodiment of the present disclosure.

FIG. 16 is a view for describing an example of an operation in which an eNB directs a channel occupation end signal and a time alignment for a frequency recycling according to an embodiment of the present disclosure.

Referring to FIG. 16, for example, after the eNB 1 ends the transmission, as shown in a reference numeral 1600, the eNB 1 informs of the timing for time alignment 1 determined for the next ECCA while transmitting the channel occupation end signal. The timing for time alignment is the timing when the CCA counter becomes zero, or the timing when an additional marginal time is given at the timing when the CCA counter becomes zero. When the eNB 1 transmits the channel occupation end signal, since neighboring eNBs 2 and 3 still perform the transmission, the neighboring eNBs 2 and 3 cannot receive the end signal of the eNB 1. The eNB 2 ends the transmission later than that of the eNB 1. As shown in a reference numeral 1602, the eNB 2 informs of the timing for time alignment 3 determined for the next ECCA while transmitting the channel occupation end signal. The eNB 1 receives the end signal of the eNB 2, and adjusts the timing for time alignment thereof to the timing for time alignment 3 of the eNB 2. In the same manner, when the eNB 2 transmits the channel occupation end signal, since a neighboring eNB 3 still performs the transmission, the neighboring eNB 3 cannot receive the end signal of the eNB 2. The eNB 3 ends the transmission later than those of the eNBs 1 and 2. As shown in a reference numeral 1604, the eNB 3 informs of the timing for time alignment 2 determined for the next ECCA while transmitting the channel occupation end signal. Then, the eNBs 1 and 2 receive the end signal of the eNB 3, and adjust the timing for time alignment thereof to the timing for time alignment 2 of the eNB 3. Since the eNB 3 does not receive any channel occupation end signal, the eNB 3 starts the transmission the scheduled timing for time alignment. Since the eNB 1 is in the state, of which the timing for time alignment is adjusted to the timing for time alignment 2 of the eNB 3, and the CCA counter becomes zero before the scheduled timing for time alignment, the eNB 1 may also start the transmission at the timing for time alignment 2 equal to that of the eNB 3, and thus frequency recycling effect may be improved. However, although the eNB 2 is in the state, of which the timing for time alignment is adjusted to the timing for time alignment 2 of the eNB 3, since the CCA counter is larger than zero at the scheduled timing for time alignment, the eNB 2 is changed into the freezing state while storing the remaining CCA counter value.

Figure 17:
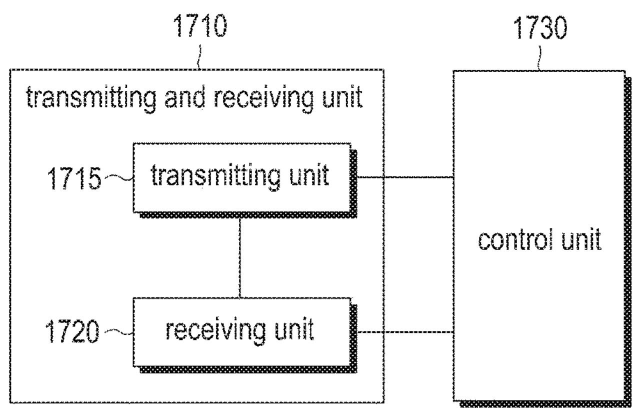
FIG. 17 is a view illustrating a configuration of a device according to an embodiment of the present disclosure.

FIG. 17 is a view illustrating a configuration of a device according to an embodiment of the present disclosure.

Referring to FIG. 17, the device of FIG. 17 may be operated as the transmitting device, the receiving device, the eNB and the UE. For convenience of description, the device of FIG. 17 includes a transmitting and receiving unit 1710 and a control unit 1730. Here, the transmitting and receiving unit 1710 includes a transmitting unit 1715 and a receiving unit 1720. Such a configuration is exemplified as an example, and may be configured by dividing detailed units performing the operations according to an embodiment of the present disclosure. The device of FIG. 17 performs the operations corresponding embodiments of FIGS. 1 A and 1B, 2, 3, 4, 5, 6, 7, 8, 9, 10A and 10B, 11, 12, 13, 14, 15A to 15C, and 16.

It is assumed that the device is operated as the transmitting device in the wireless communication system using the shared band. In this case, the control unit 1730 determines the length of the time period for determining the next data transmission in the shared band, based on at least one of link information configured with two or more receiving devices, and the measurement value of the transmitting device, and checks whether the channel of the shared band is occupied in the time period of the determined length. Here, the link information configured with two or more receiving devices corresponds to the above described triggering condition from the view of the receiving device. The measurement value of the transmitting device corresponds to the triggering condition from the view of the transmitting device. The length of the time period corresponds to the above described q value. In addition, the control unit 1730 may control the transmitting unit 1715 to transmit the next data according to the result of the checking. Here, the link information may include at least one of the result of the reception of the current data received by a corresponding receiving device, the length of the time period for determining the transmission of the current data in the shared band, the priority of a corresponding link, and the channel state information of the receiving device. The detailed definitions of each piece of the link information are the same as those of the above description, and thus repetitive descriptions are omitted.

The control unit 1730 may determine the length of the time period for two or more receiving devices individually or may determine the length of the time period for two or more receiving devices as a common value, as described above. In addition, when the control unit 1730 determines the length of the time period, the control unit 1730 may determine the length of the time period using the energy measurement result for the shared band at different time points according to above described embodiments. Here, when the transmitting device occupies the channel of the shared band, the measurement value of the transmitting device may include at least one of the energy measurement result measured in the two or more predetermined time slots, the number of the successive check of the channel vacancy of the shared band, the channel occupation result of the shared band, the number of maintenances of the time period according to the identification of the channel occupation of the shared band, and the information on whether the channel is occupied at the predetermined time point. In the same manner, each definition of the measurement values of the transmitting device is also the same as that of the above description, and thus repetitive descriptions are omitted.

When the control unit 1730 determines the length of the time period based on the measurement value of the transmitting device according to the above described embodiments, the control unit 1730 may transfer the information indicating two or more time slots to at least two receiving devices and the neighboring transmitting device, may receive the result information indicating whether the channel of the shared band is occupied from at least two receiving devices in two or more time slots, and may determine the length of the time period based on the result information.

In addition, when the control unit 1730 determines the length of the time period based on the measurement value of the transmitting device, the control unit 1730 may perform the determination based on the energy measurement result for the shared band in the configured idle period after transmitting the current data by occupying the channel of the shared band according to the above described embodiments.

It may be understood that all operations for the above-mentioned synchronization support are performed by the control unit 1730. In addition, according to an embodiment, the control unit 1730 and the transmitting and receiving device 1710 are not always implemented as separate devices, and it is certain that the control unit 1730 and the transmitting and receiving device 1710 may be implemented in one configuration unit as a type such as a single chip.

It should be noted that the configuration diagram of the LAA UE exemplified in FIGS. 1A and 1B, 2, 3, 4, 5, 6, 7, 8, and 9, the example diagram of the method of transmitting the LAA control/data signals, the operation procedure example diagram of the LAA UE, the resource frame configuration example diagram, and configuration diagrams of the UE devices are not intended to limit the scope of the claims of the present disclosure. That is, all configurations, an entity or operations illustrated in FIGS. 1 A and 1B, 2, 3, 4, 5, 6, 7, 8, and 9 should not be interpreted as essentially structural elements for carrying out the present disclosure, and variations and modifications of the present disclosure may be implemented without departing from the scope of the present disclosure.

The above described operations of the BS or UE may be implemented by providing a memory device storing corresponding program codes in any constituent unit of the BS or UE apparatus. That is, the controller of the BS or UE may perform the above described operations by reading and executing the program code stored in the memory device by means of a processor or a central processing unit (CPU).

The entity, the function, the BS, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

Various embodiments of the present disclosure may provide a resource access method which considers a co-existence with a WLAN in a cellular communication of a shared band.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a compact disc ROM (CD-ROM), a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a digital versatile disc (DVD), a magnetic disk, or a magnetic tape, regardless of its ability to be erased or its ability to be re-recorded. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting data by a transmitting device in a wireless communication device using a shared band, the method comprising:

transmitting present data in a first time period for present data transmission;

allocating time slots capable of measuring information on whether a channel of the shared band is occupied;

receiving a measurement value in the allocated time slots;

determining a variable of a clear channel assessment (CCA) window, wherein a number of operations of CCAs is determined based on the variable of the CCA window;

identifying a second time period based on the variable;

determining whether the channel of the shared band is occupied at the second time period; and transmitting next data, if the channel of the shared band is not occupied, wherein the variable is determined based on the measurement value and acknowledgment information, the acknowledgement information being received from at least two receiving devices in response to the present data transmission, wherein the measurement value includes an energy measurement result for the shared band at different time points or an energy measurement result for the shared band in an idle period configured after transmitting present data by occupying the channel, and wherein, if the transmitting device occupies the channel, the measurement value includes at least one of an energy measurement result measured in two or more time slots, a number of successive identifications of a vacancy of the channel, a channel occupation result of the shared band, a number of maintenances of the second time period according to an identification of the channel occupation of the shared band, and information on whether the channel is occupied or not at a predetermined time point.

2. The method of claim 1, further comprising:

receiving channel state information, wherein the variable is determined further based on the channel state information.

3. The method of claim 1, wherein the second time period is determined for each of the at least two receiving devices individually, or as a common value.

4. The method claim 1, further comprising:

determining the second time period based on the measurement value;

transferring information indicating the two or more time slots to a transmitting device adjacent to the at least two receiving devices;

receiving result information indicating whether the channel of the shared band is occupied from the at least two receiving devices at the two or more time slots; and determining the second time period based on the result information.

5. A method of receiving data by a receiving device in a wireless communication system using a shared band, the method comprising:

receiving, from a transmitting device, present data in a first time period for present data transmission via the shared band;

transmitting, to the transmitting device, acknowledgement information in response to the receiving the present data;

transmitting a measurement value in allocated time slots, the time slots being capable of measuring information on whether a channel of the shared band is occupied; and receiving, from the transmitting device, next data, wherein a second time period for determining whether the channel of the shared band is occupied is determined based on a variable of a clear channel assessment (CCA) window, wherein a number of operations of CCAs is determined based on the variable of the CCA window, wherein the variable is determined based on the acknowledgment information and the measurement value, wherein the next data is received, if the channel of the shared band is not occupied, wherein the measurement value includes an energy measurement result for the shared band or an energy measurement result for the shared band in an idle period configured after transmitting present data by occupying the channel, and wherein if the transmitting device occupies a channel of the shared band, the measurement value includes at least one of an energy measurement result measured in two or more determined time slots, a number of successive identifications of a vacancy of the channel of the shared band, a channel occupation result of the shared band, a number of maintenances of the second time period according to an identification of the channel occupation of the shared band, and information on whether the channel is occupied at a predetermined time point.

6. The method of claim 5, further comprising:

transmitting channel state information in the first time period, wherein the variable is determined further based on the channel state information.

7. The method of claim 5, wherein the second time period is determined for each of the at least two receiving devices individually, or as a common value.

8. The method of claim 5, wherein if the second time period is determined using both the acknowledgement information and the measurement value, a reception result of data received via the shared band is received from the transmitting device, and wherein, if an energy measurement result of the shared band in the first time period indicates that the channel is not occupied, the second time period is re-configured based on the reception result.

9. A transmitting device for transmitting data in a wireless communication device using a shared band, the transmitting device comprising:

a transceiver; and a processor configured to:

control the transceiver to transmit present data in a first time period for present data transmission, allocate time slots capable of measuring information on whether a channel of the shared band is occupied, control the transceiver to receive a measurement value in the allocated time slots, determine a variable of a clear channel assessment (CCA) window, wherein a number of operations of CCAs is determined based on the variable of the CCA window, identify a second time period based on the variable, determine whether the channel of the shared band is occupied at the second time period, and control the transceiver to transmit next data, if the channel of the shared band is not occupied, wherein the variable is determined based on the measurement value and acknowledgment information, the acknowledgement information being received from at least two receiving devices in response to the present data transmission, wherein the measurement value includes an energy measurement result for the shared band at different time points or an energy measurement result for the shared band in an idle period configured after transmitting present data by occupying the channel, and wherein if the transmitting device occupies the channel, the measurement value includes at least one of an energy measurement result measured in two or more time slots, a number of successive identifications of a vacancy of the channel, a channel occupation result of the shared band, a number of maintenances of the second time period according to an identification of the channel occupation of the shared band, and information on whether the channel is occupied or not at a predetermined time point.

10. The transmitting device of claim 9, wherein the processor is further configured to control the transceiver to receive channel state information, and wherein the variable is determined further based on the channel state information.

11. The transmitting device of claim 9, wherein the second time period is determined for each of the at least two receiving devices individually, or as a common value.

12. The transmitting device of claim 9, wherein the processor is further configured to:

determine the second time period based on the measurement value, if the next time period is determined based on the measurement value, control to transfer information indicating the two or more time slots to a transmitting device adjacent to the at least two receiving devices, through the transmitting and receiving unit, and if result information indicating whether the channel of the shared band is occupied is received from the at least two receiving devices the at two or more time slots, via the transceiver, determine the second time period based on the result information.

13. A receiving device for receiving data in a wireless communication system using a shared band, the receiving device comprising:

a transceiver; and a processor configured to control the transceiver to:

receive, from a transmitting device, present data in a first time period for present data transmission via the shared band, transmit, to the transmitting device, acknowledgement information in response to the receiving the present data, transmit a measurement value in allocated time slots, the time slots being capable of measuring information on whether a channel of the shared band is occupied, and receiving, from the transmitting device, next data, wherein a second time period for determining whether the channel of the shared band is occupied is determined based on a variable of a clear channel assessment (CCA) window, wherein a number of operations of CCAs is determined based on the variable of the CCA window, wherein the variable is determined based on the acknowledgment information and the measurement value, wherein the next data is received, if the channel of the shared band is not occupied, wherein the measurement value includes an energy measurement result for the shared band or an energy measurement result for the shared band in an idle period configured after transmitting present data by occupying the channel, and wherein if the transmitting device occupies a channel of the shared band, the measurement value includes at least one of an energy measurement result measured in two or more determined time slots, a number of successive identifications of a vacancy of the channel of the shared band, a channel occupation result of the shared band, a number of maintenances of the second time period according to an identification of the channel occupation of the shared band, and information on whether the channel is occupied or not at a predetermined time point.

14. The receiving device of claim 13, wherein the processor is further configured to control the transceiver to transmit channel state information in the first time period, and wherein the variable is determined further based on the channel state information.

15. The receiving device of claim 13, wherein the second time period is determined for each of the at least two receiving devices individually, or as a common value.

16. The receiving device of claim 13, wherein if the second time period is determined using both the acknowledgement information and the measurement value, a reception result of data received via the shared band is received from the transmitting device, and wherein if an energy measurement result of the shared band in the first time period indicates that the channel is not occupied, the second time period is re-configured based on the reception result.

* * * * *